United States Patent
Heemskerk et al.

(10) Patent No.: US 7,123,557 B2
(45) Date of Patent: Oct. 17, 2006

(54) DISC-SHAPED RECORDING MEDIUM DISC DRIVING DEVICE AND METHOD AND APPARATUS FOR PRODUCING DISC

(75) Inventors: Jacobus Petrus Josephus Heemskerk, Veldhoven (NL); Cornelis Marinus Schep, Eindhoven (NL); Aalbert Stek, Eindhoven (NL); Shinichi Tanaka, Kyoto (JP); Hiromichi Ishibashi, Osaka (JP); Shigeru Furumiya, Hyogo (JP); Hiroshi Ogawa, Kanagawa (JP); Tamotsu Yamagami, Kanagawa (JP); Shoei Kobayashi, Kanagawa (JP)

(73) Assignees: Koninklijke Philips Electronics N.V., Eindhoven (NL); Matsushita Electric Industrial Co., LTD, Kadoma (JP); Sony Corporation, Tokyo (JP)

( * ) Notice: Subject to any disclaimer, the term of this patent is extended or adjusted under 35 U.S.C. 154(b) by 686 days.

(21) Appl. No.: 10/450,459

(22) PCT Filed: Oct. 10, 2002

(86) PCT No.: PCT/JP02/10558

§ 371 (c)(1),
(2), (4) Date: Jun. 13, 2003

(87) PCT Pub. No.: WO03/034414

PCT Pub. Date: Apr. 24, 2003

(65) Prior Publication Data

US 2004/0156291 A1    Aug. 12, 2004

(30) Foreign Application Priority Data

Oct. 16, 2001   (JP)  ............... 2001-318669

(51) Int. Cl.
    *G11B 15/52* (2006.01)

(52) U.S. Cl. ............... 369/47.19; 369/124.04; 369/275.3

(58) Field of Classification Search ............. None
    See application file for complete search history.

(56) References Cited

U.S. PATENT DOCUMENTS

| | | | | |
|---|---|---|---|---|
| 6,075,761 A | * | 6/2000 | Akiyama et al. | 369/47.4 |
| 6,201,773 B1 | * | 3/2001 | Aoki | 369/44.13 |
| 6,714,508 B1 | * | 3/2004 | Spruit et al. | 369/275.4 |

FOREIGN PATENT DOCUMENTS

| | | |
|---|---|---|
| JP | 2000-137930 | 5/2000 |
| JP | 2001-118255 | 4/2001 |
| JP | 2001-126413 | 5/2001 |
| JP | 2001-143273 | 5/2001 |
| JP | 2002-342941 | 11/2002 |
| JP | 2002-358659 | 12/2002 |
| WO | WO 02/21518 | 3/2002 |

* cited by examiner

OTHER PUBLICATIONS

NIKKEI Electronics, May 21, 2001, No. 796, p. 49-56.

*Primary Examiner*—Paul W. Huber
(74) *Attorney, Agent, or Firm*—Oblon, Spivak, McClelland, Maier & Neustadt, P.C.

(57) ABSTRACT

The information such as address is to be efficiently formed into wobble components and further the S/N ratio in reproducing the information formed into the wobble components is to be improved. In an optical disc of the present invention, there are recorded in a wobble the address information modulated in accordance with the MSK (minimum shift keying) system and the address information modulated in accordance with a modulation system in which even harmonics signals are added to a sinusoidal carrier signal and in which the polarity of the harmonics signal is changed depending on the sign of the data for modulation.

31 Claims, 29 Drawing Sheets

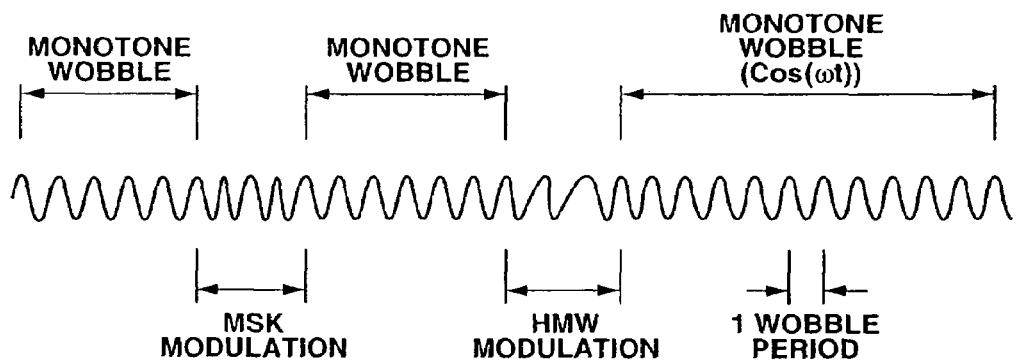
FIG.3
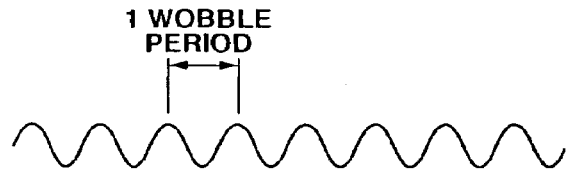
FIG.4A REFERENCE CARRIER SIGNAL (Cos(ωt))
FIG.4B DATA FOR MODULATION
FIG.4C PRECODE DATA
FIG.4D MSK STREAM
FIG.4E SIGNAL WAVEFORM

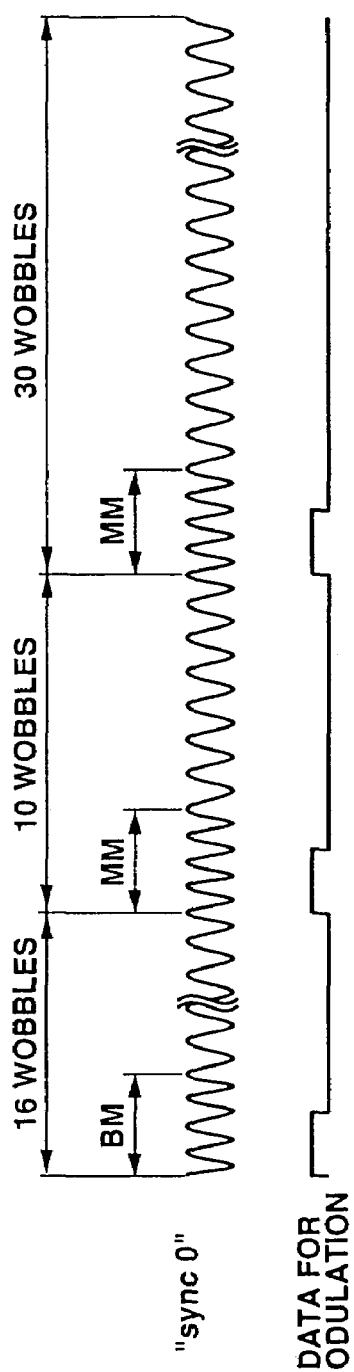

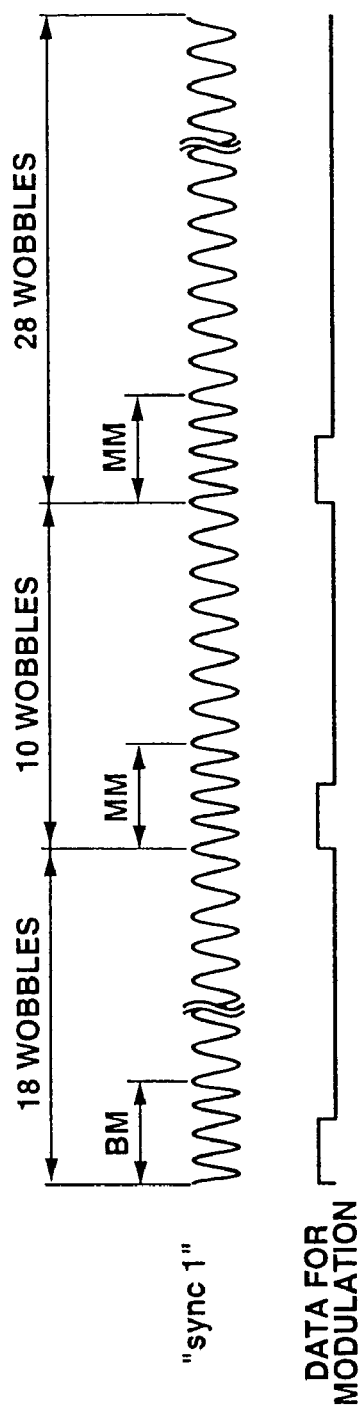

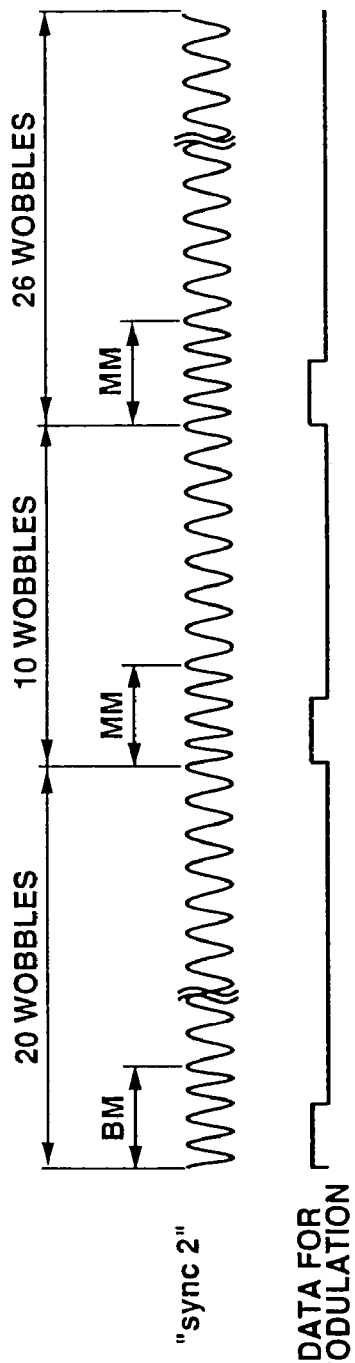

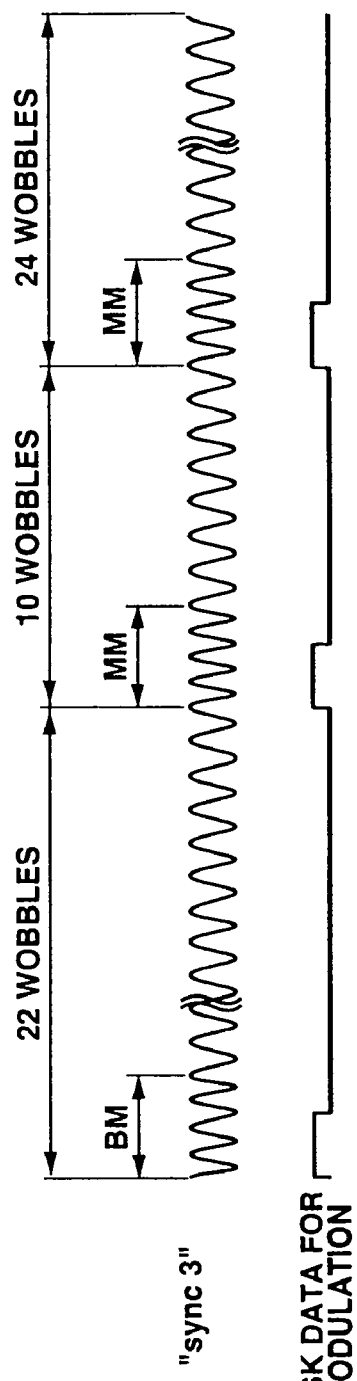

FIG. 24B MSK DATA FOR MODULATION
FIG. 24C HMW SIGNAL

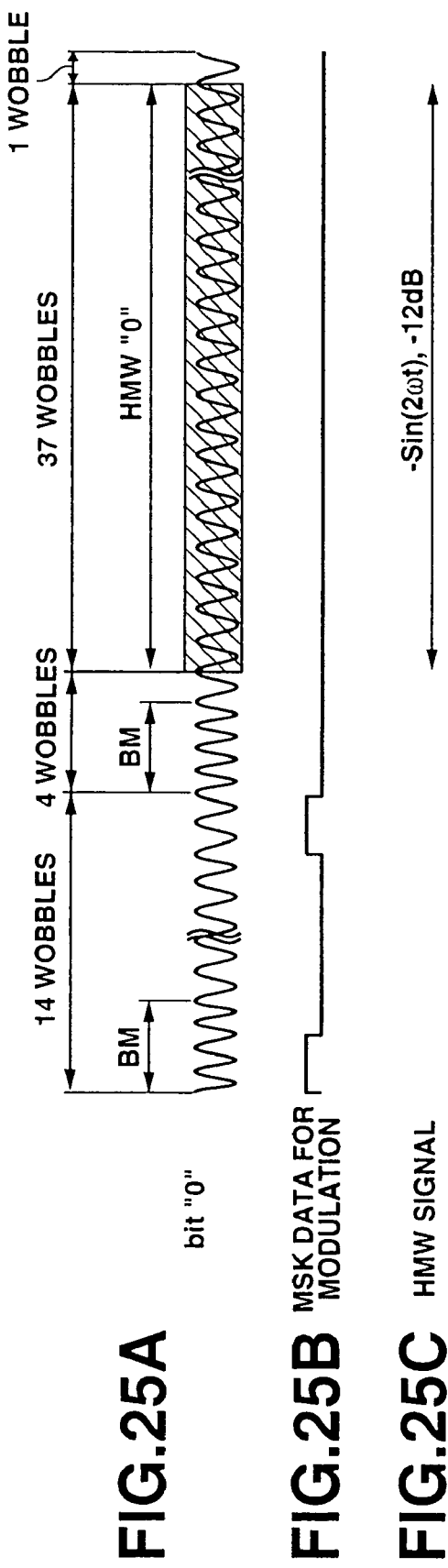

FIG. 26

| | |
|---|---|
| Layer | 3 bits |
| RUB | 19 bits |
| Address number / RUB | 2 bits |
| Aux data | 12 bits |
| Parity | 24 bits |
| Total | 60 bits |

FIG.27

| | 0 | 1 | 2 | |
|---|---|---|---|---|
| Nibble 0 | laayer no.bit2 | laayer no.bit1 | laayer no.bit0 | ADIP Address 6nibble |
| Nibble 1 | RUB no.bit17 | RUB no.bit16 | RUB no.bit18 | |
| Nibble 2 | RUB no.bit13 | RUB no.bit12 | RUB no.bit14 | |
| Nibble 3 | RUB no.bit9 | RUB no.bit8 | RUB no.bit10 | |
| Nibble 4 | RUB no.bit5 | RUB no.bit4 | RUB no.bit6 | |
| Nibble 5 | RUB no.bit1 | RUB no.bit0 | RUB no.bit2 | |
| Nibble 6 | reserve bit11 | reserve bit10 | address no.bit0 | Aux data 3nibble |
| Nibble 7 | reserve bit7 | reserve bit6 | reserve bit8 | |
| Nibble 8 | reserve bit3 | reserve bit2 | reserve bit4 | |
| Nibble 9 | parity bit23 | parity bit22 | reserve bit0 | Nibble based ID-RS ECC 6nibble |
| Nibble 10 | parity bit19 | parity bit18 | parity bit20 | |
| Nibble 11 | parity bit15 | parity bit14 | parity bit16 | |
| Nibble 12 | parity bit11 | parity bit10 | parity bit12 | |
| Nibble 13 | parity bit7 | parity bit6 | parity bit8 | |
| Nibble 14 | parity bit3 | parity bit2 | parity bit4 | |

Nibbles 0–8: data 9 nibble
Nibbles 9–14: parity 6 nibble

FIG.28

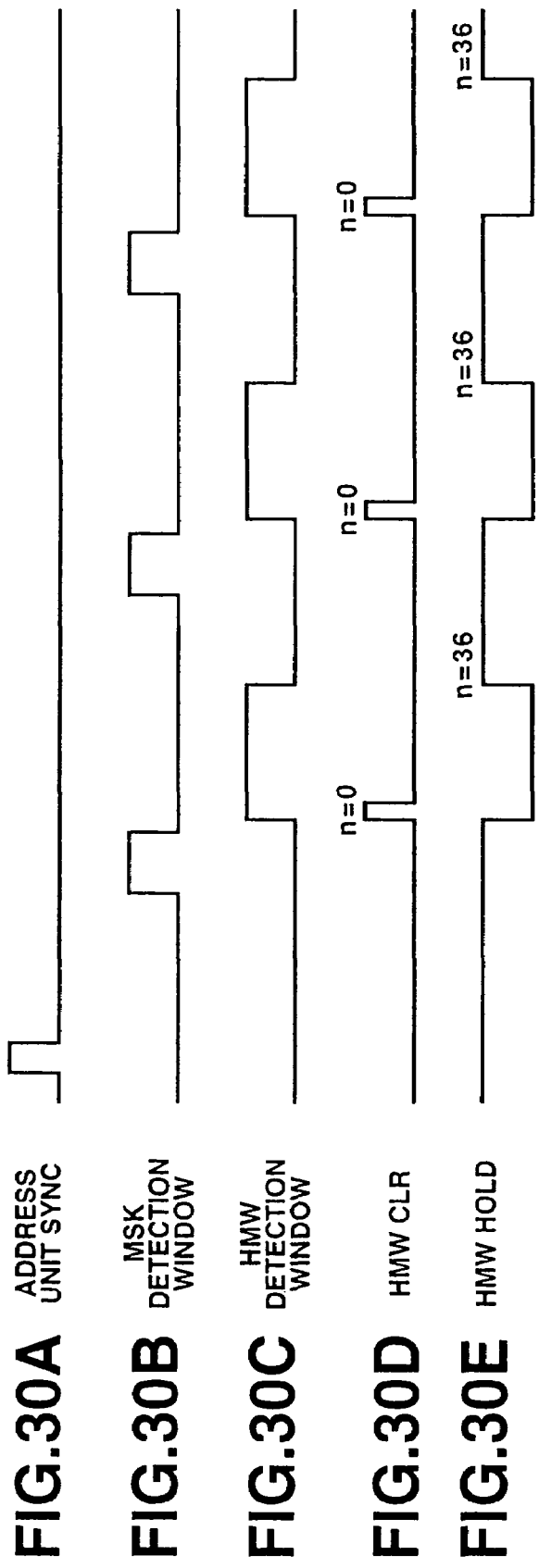

DISC-SHAPED RECORDING MEDIUM DISC DRIVING DEVICE AND METHOD AND APPARATUS FOR PRODUCING DISC

This application is a 371 of PCT/JP02/10558, filed Oct. 10, 2002.

TECHNICAL FIELD

This invention relates to a disc-shaped recording medium, having a land and/or a groove formed thereon in a circling fashion for operating as a recording track formed in a meandering fashion in meeting with the wobble signal, a disc driving device for recording and/or reproducing data for this disc-shaped recording medium, and to a method and apparatus for producing this disc-shaped recording medium.

BACKGROUND ART

Up to now, an optical disc having a guide groove, termed circling a pre-groove, has been known. If this pre-groove is formed, the groove and/or the land (area sandwiched between neighboring turns of the groove) becomes a recording track. By this pre-groove, formed in the optical disc, the disc driving side, responsible for recording and/or reproduction, is able to detect components of both edges of the recording track from the reflected laser light to effect servo control so that the laser light will be illuminated centrally of the two edges.

There has so far been known an optical disc in which the pre-groove is caused to meander in meeting with the wobble signal corresponding to FM modulated or PSK modulated carrier signal. In the modulating components of the wobble signal, there is contained e.g., the physical address information of the recording track at the recording positions of the wobble signal. So, the disc driving side, responsible for recording and/or reproduction, is able to detect the wobble signal from signals representing fluctuating components of both edges of the recording tracks (so-called push-pull signals) to demodulate the address information contained in the wobble signal to perform address control of the recording and/or reproducing positions.

However, with the system of inserting e.g., the address information into the wobble signal corresponding to the FM modulated carrier signals, a problem is raised that address reproduction characteristics are deteriorated by cross-talk components from neighboring tracks. In the system of inserting e.g., the address information into the wobble signal by PSK modulating the carrier signal, there is raised a problem that higher harmonics at the phase change points are superimposed on the playback signals to deteriorate reproduction characteristics. Moreover, in the case of the PSK modulation, the higher harmonics components are contained, with the result that the circuit configuration of the wobble signal demodulating circuit becomes complicated.

DISCLOSURE OF THE INVENTION

It is therefore an object of the present invention to provide a disc-shaped recording medium having the information such as address information formed efficiently into the wobble components, and in which the S/N ratio may be improved in reproducing the information contained in the wobble components, a disc driving device for recording and/or reproducing data for this disc-shaped recording medium, and a method and apparatus for producing this disc-shaped recording medium.

For accomplishing the above object, the present invention provides a disc-shaped recording medium having a land and/or a groove formed thereon in a circling fashion for operating as a recording track, the recording track meandering depending on a wobble signal, wherein the wobble signal comprises a first digital information MSK modulated using a first sinusoidal signal of a predetermined frequency and using a second sinusoidal signal of a frequency different from the predetermined frequency, and a second digital information modulated onto a sinusoidal carrier signal by adding even harmonics signals to the sinusoidal carrier signal and by changing the polarity of the harmonics signals according to the second digital information (HMW modulated).

In another aspect, the present invention provides a disc-shaped recording medium having a land and/or a groove formed thereon in a circling fashion for operating as a recording track, the recording track meandering depending on a wobble signal, wherein an address unit with the address information stated therein is formed in the wobble signal as a predetermined data unit, the address information comprising at least an address of the recording track, the address unit is constructed to include at least one bit block representing bits forming the address information, and the at least one block is formed in a waveform comprising a predetermined number of consecutive periods of a sinusoidal carrier signal by inserting a first bit string MSK modulated using the sinusoidal carrier signal and using a further sinusoidal signal of a frequency different from a frequency of the sinusoidal carrier signal, and a second bit string modulated onto the sinusoidal carrier signal by adding even harmonics signals to the sinusoidal carrier signal and by changing the polarity of the harmonics signals according to the second bit string (HMW modulated).

The present invention also provides a disc driving device for recording and/or reproducing a disc-shaped recording medium, having a land and/or a groove formed thereon in a circling fashion for operating as a recording track, the recording track meandering depending on a wobble signal, the disc driving device comprising:

wobble information demodulating means for reproducing the wobble signal from the disc-shaped recording medium and for demodulating the wobble signal to retrieve the digital information contained in the wobble signal;

wherein the wobble information demodulating means includes:

a first demodulating unit for retrieving the first digital information which is MSK modulated using a first sinusoidal signal of a predetermined frequency and using a sinusoidal signal of a frequency different from the predetermined frequency of the first sinusoidal signal; and a second demodulating unit for retrieving the second digital information which is modulated onto a sinusoidal carrier signal by adding even harmonics signals to the sinusoidal carrier signal and by changing the polarity of the harmonics signals according to the: second digital information (HMW modulated).

The present invention also provides an apparatus for manufacturing a disc-shaped recording medium by forming a land and/or a groove in a circling fashion on a surface of a master disc of a disc-shaped recording medium, the apparatus comprising:

means for forming the land and/or groove in a meandering fashion depending on a wobble signal including a first digital information MSK modulated using a first sinusoidal signal of a predetermined frequency and using a second sinusoidal signal of a frequency different from the predetermined frequency of the first sinusoidal signal, and a second digital information modulated onto a sinusoidal carrier signal by adding even harmonics signals to the sinusoidal carrier signal and by changing the polarity of the harmonics signals according to the second digital information (HMW modulated).

In yet another aspect, the present invention provides a method for manufacturing a disc-shaped recording medium by forming a land and/or a groove in a circling fashion on a surface of a master disc of a disc-shaped recording medium, the method comprising the step of:

forming the land and/or groove in a meandering fashion depending on a wobble signal including a first digital information MSK modulated using a first sinusoidal signal of a predetermined frequency and using a second sinusoidal signal of a frequency different from the predetermined frequency of the first sinusoidal signal, and a second digital information modulated onto a sinusoidal carrier signal by adding even harmonics signals to the sinusoidal carrier signal and by changing the polarity of the harmonics signals according to the second digital information (HMW modulated).

BRIEF DESCRIPTION OF THE DRAWINGS

FIG. 3 shows the MSK- and HMW modulated wobble signal.

FIGS. 4A to 4E illustrate MSK modulation.

FIGS. 19A and 19B show a signal waveform of a first sync bit in the sync part and data for modulation.

FIGS. 20A and 20B show a signal waveform of a second sync bit in the sync part and data for modulation.

FIGS. 21A and 21B show a signal waveform of a third sync bit in the first sync part and data for modulation.

FIGS. 22A and 22B show a signal waveform of a fourth sync bit in the first sync part and data for modulation.

FIGS. 24A to 24C show a signal waveform of an ADIP bit representing bit "1" in the data part and data for modulation.

FIGS. 25A to 25C show a signal waveform of an ADIP bit representing bit "0" in the data part and data for modulation.

FIG. 26 shows an overall configuration of the format of the address unit.

FIG. 27 shows the contents of the address information represented by the ADIP bit.

FIG. 28 shows an error correction block of the address information.

FIGS. 30A to 30E show the control timing of the address demodulation circuit.

BEST MODE FOR CARRYING OUT THE INVENTION

The wobbling system for an optical disc, an optical disc drive for recording and/or reproducing data on or from the optical disc, and a method for producing the optical disc, according to the present invention, are now explained in detail.

Figure 1:
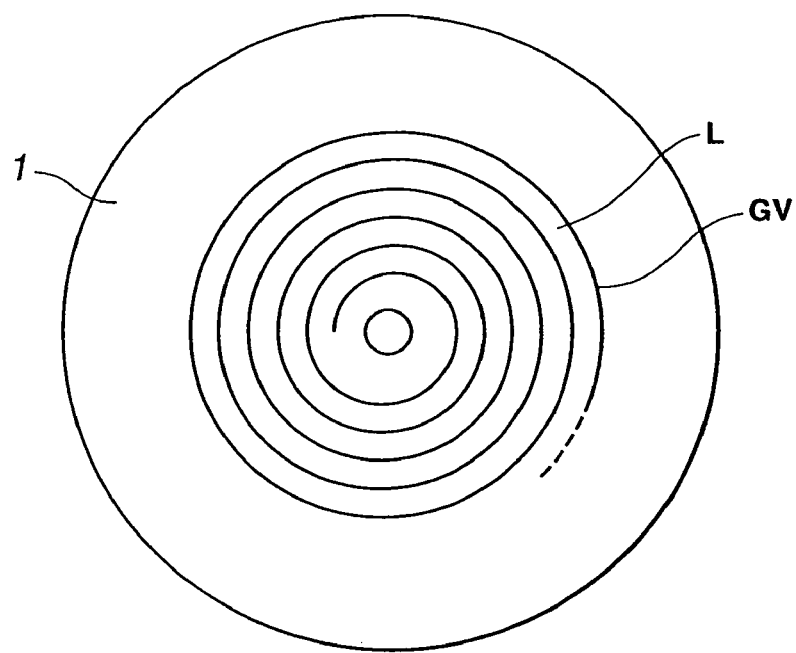
FIG. 1 shows a track configuration of an optical disc embodying the present invention.

1. Wobbling System for Optical Disc 1-1 Overall Explanation of the Wobbling System In an optical disc according to an embodiment of the present invention, a groove GV, operating as a recording track, is formed, as shown in FIG. 1. This groove GV is formed spirally from the inner rim towards the outer rim of the disc. Thus, when seen in a radial cross-section, the optical disc has a convex-shaped land L and a recessed groove GV, in alternation with one another, as shown in FIG. 2.

Figure 2:
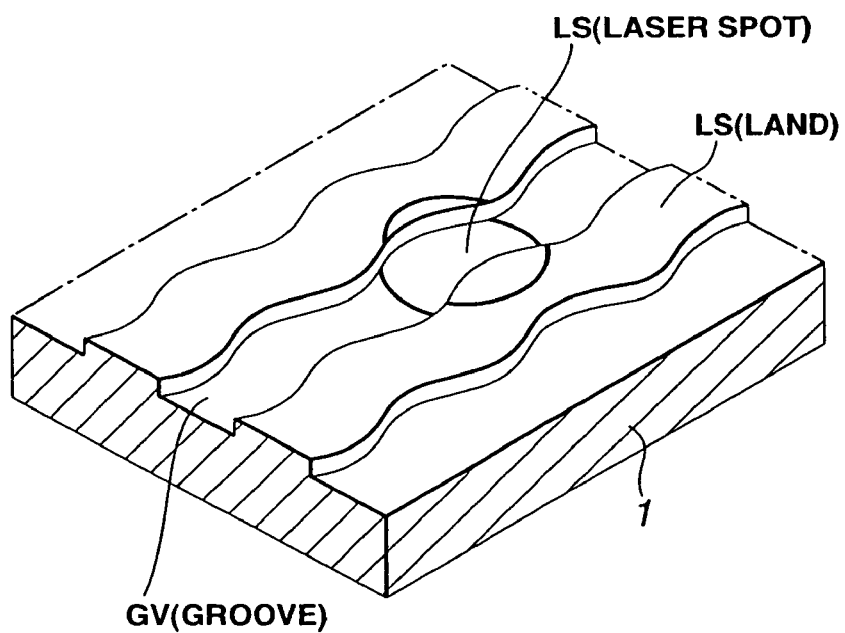
FIG. 2 shows a meandering state of the grooves.

The groove GV of the optical disc 1 is formed meandering relative to the tangential direction thereof, as shown in FIG. 2. The meandering shape of the groove GV is in meeting with the wobbling signal. So, with the optical disc drive, both edge positions of the groove GV are detected from the reflected light of a laser spot LS illuminated on the groove GV and, as the laser spot LS is moved along the recording track, the components of variations of the edge positions relative to the disc radius direction are extracted to reproduce the wobble signal.

In the wobble signal, the address information (physical address and other auxiliary information) for a recording position of the recording track is included modulated. So, with the present optical disc drive, the address information, for example, is demodulated from the wobble signal to effect e.g., address control at the time of data recording and reproduction.

In the embodiments of the present invention, the optical disc designed for groove recording is explained. However, the present invention may be applied not only to such optical disc for groove recording but to an optical disc for land recording designed for recording data on the land or to an optical disc for land-groove recording designed for recording data on the land and the groove.

With the optical disc 1 of the present embodiment, two modulating systems are used for modulating the wobble signal with the address information. One such system is the MSK (minimum shift keying) modulation system, while the other is a system in which even harmonics are added to a sinusoidal carrier signal and in which the polarity of the even harmonics is changed depending on the sign of the data for modulation or the data to be modulated. That is, the other is a system in which even harmonics of a sinusoidal carrier signal are added to the sinusoidal carrier signal and in which the polarity of the even harmonics is changed depending on the sign of the data for modulation. The modulating system in which even harmonics are added to a sinusoidal carrier signal and in which the polarity of the even harmonics is changed depending on the sign of the data for modulation is termed HMW (harmonic wave) modulation.

In the present embodiment of the optical disc 1, shown in FIG. 3, a block comprised of a predetermined number of consecutive periods of a sinusoidal carrier signal waveform of a predetermined frequency is formed, and a wobble signal having an MSK modulated portion and an HMW modulated portion is generated in the block. In the MSK modulated portion and in the HMW modulated portion, the MSK modulated address information and the HMW modulated address information are inserted, respectively. That is, the MSK modulated address information and the HMW modulated address information are inserted in different positions in the block. One of the two sinusoidal carrier signals used in the MSK modulation and the carrier signal of the HMW modulation correspond to the aforementioned reference carrier signal. The MSK modulated portion and the HMW modulated portions are arranged at different positions in the block, there being arranged a reference carrier signal of not less than one period of the reference carrier signal between the MSK modulation portion and the HMW modulation portion.

Meanwhile, the portion of the block not subjected to data modulation and in which only the frequency component of the reference carrier signal is presented is termed a monotone wobble. The sinusoidal signal used as the reference carrier signal is $\cos(\omega t)$. One period of the reference carrier signal is termed one wobble period. The frequency of the reference carrier signal is constant from the inner to the outer rims and is determined in relation to the linear velocity of movement of the laser spot along the recording track.

The methods for MSK modulation and HMW modulation are further explained in detail.

1-2 MSK Modulation

First, the modulation system of the address information employing the MSK modulation system is explained.

The MSK modulation is the continuous-phase FSK (frequency shift keying) modulation with the modulation index of 0.5. In the FSK modulation, the codes "0" and "1" of the data for modulation are associated with two carrier signals, namely a carrier signal with a frequency f1 and a carrier signal with a frequency f2 for modulation, respectively. That is, the FSK modulation system is such a system in which a sinusoidal waveform with the frequency f1 is output if the data for modulation is "0" and a sinusoidal waveform with the frequency f2 is output if the data for modulation is "1". Moreover, in the continuous-phase FSK modulation, the two carrier signals are phase-continuous or same in phase at the code switching timing of the data for modulation.

In this FSK modulation, the modulation index m is defined: Specifically, the modulation index m is defined by $$m = |f1 - f2|T$$

where T is the rate of transmission of the data for modulation (1/time of the shortest code length). The continuous FSK modulation for m=0.5 is termed the MSK modulation.

In the present optical disc 1, the shortest code length L of the data for modulation, subjected to the MSK modulation, is equal to two wobble periods, as shown in FIGS. 4A and 4B. Meanwhile, the shortest code length L of the data for modulation may be any optional length provided that it is an integral number times the wobble period and not less than twice the wobble period. On the other hand, one of the two frequencies used in MSK modulation is the same as the frequency of the reference carrier signal, with the other frequency being 1.5 times the frequency of the reference carrier signal. That is, one of the signal waveforms used for MSK modulation is $\cos(\omega t)$ or $-\cos(\omega t)$, with the other being $\cos(1.5\omega t)$ or $-\cos(1.5\omega t)$.

In inserting the data for modulation in the MSK modulation system into the wobble signal of the optical disc 1, a data stream of the data for modulation is subjected to differential encoding processing in terms of a clock corresponding to the wobble period as a unit, as shown in FIG. 4C. That is, the stream of the data for modulation and delayed data delayed by one period of the reference carrier signal are subjected to differential encoding processing. The data resulting from the differential encoding processing is precode data.

This precode data is MSK modulated to generate an MSK stream. As shown in FIG. 4D, the signal waveform of this MSK stream is the waveform of the same frequency as the reference carrier or $\cos(\omega t)$ or its inverted waveform $-\cos(\omega t)$ if the precode data is "0", while being the waveform of the frequency 1.5 times the frequency of the reference carrier or $\cos(1.5\omega t)$ or its inverted waveform $-\cos(1.5\omega t)$ if the precode data is "1". Thus, if the data string of the data for modulation is of a pattern "010" as shown in FIG. 4B, the signal waveform of the MSK stream is $\cos(\omega t)$, $\cos(\omega t)$, $\cos(1.5\omega t)$, $-\cos(\omega t)$, $-\cos(1.5\omega t)$, $\cos(\omega t)$, every wobble period, as shown in FIG. 4E.

In the present optical disc 1, the wobble signal is modulated with the address information by rendering the wobble signal the aforementioned MSK stream. So, the conversion of data from FIG. 4B to FIG. 4D is termed modulation and the conversion of data in the opposite direction is termed demodulation.

If the data for modulation is differential-coded by way of performing the aforementioned MSK modulation, synchronous detection of the data for modulation becomes possible. The synchronous detection becomes possible for the following reason:

With the differential-coded data (precode data), the bit asserts itself (becomes "1") at a code change point of the data for modulation. Since the code length of the data for modulation is selected to be not less than twice the wobble period, the reference carrier signal (cos(ωt)) or its inverted signal (−cos(ωt)) is necessarily inserted into the latter half of the code length of the data for modulation. If the bit of the precode data is "1", the waveform of a frequency 1.5 times that of the reference carrier signal is inserted and, at the code switching timing, the data before switching is in phase with that after switching. Therefore, the signal waveform inserted into the latter half of the code length of the data for modulation is necessarily the waveform of the reference carrier signal (cos(ωt)) if the data for modulation is "0", whereas, if the data for modulation is "1", the signal waveform is necessarily its inverted signal (−cos(ωt)). The synchronous detection output is of a plus value if the data for modulation is in phase with the carrier signal, while being of a minus value if the data for modulation is inverted in phase. Thus, the data for modulation can be demodulated if the MSK modulated signal described above is subjected to synchronous detection with the reference carrier signal.

Meanwhile, in the MSK modulation, modulation occurs in an in-phase state at the code switching positions. Thus, a delay is produced until the synchronous detection signal is inverted in level. Therefore, if the signal MSK-modulated as described above is to be demodulated, an integrating window of the synchronous detection output is delayed by one-half the wobble period to produce a correctly detected output.

Figure 5:
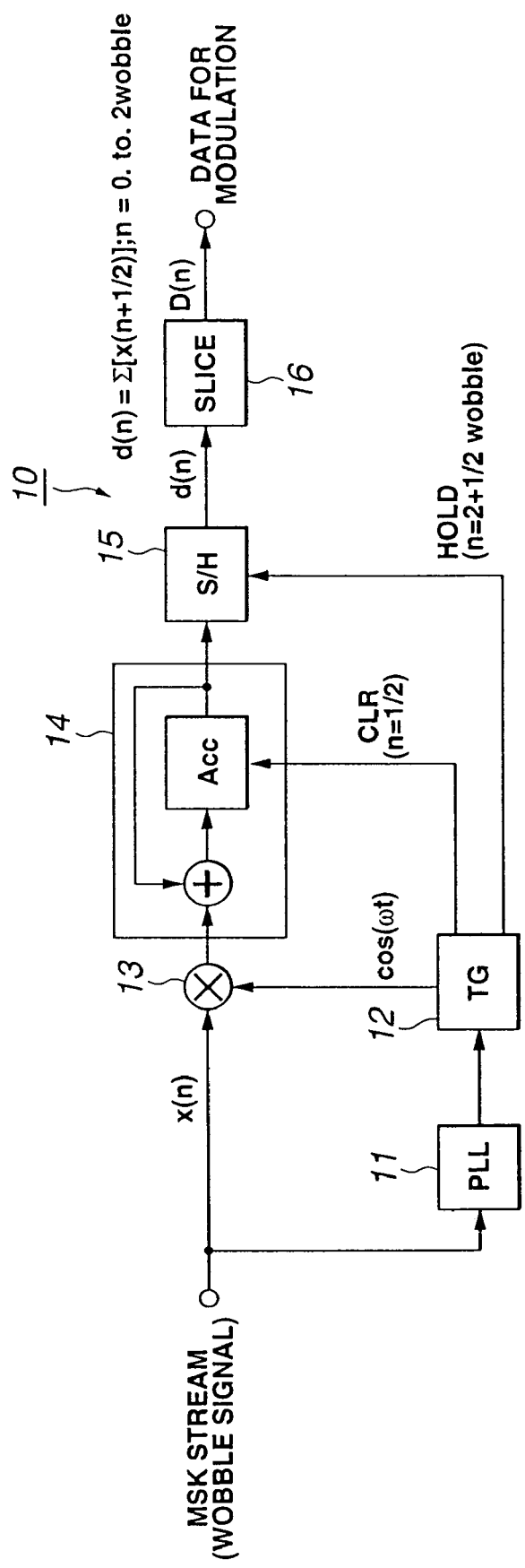
FIG. 5 shows an MSK demodulation circuit for demodulating MSK modulated wobble signals.

FIG. 5 shows an MSK demodulating circuit for demodulating the data for modulation from the above-mentioned MSK stream.

An MSK demodulating circuit 10 includes a PLL circuit 11, a timing generator (TG) 12, a multiplier 13, an integrator 14, a sample-and-hold (SH) circuit 15 and a slicing circuit 16, as shown in FIG. 5.

The PLL circuit 11 is fed with a wobble signal (MSK modulated stream). The PLL circuit 11 detects edge components from the input wobble signal to generate wobble clocks synchronized with the reference carrier signal (cos (ωt)). The so generated wobble clocks are sent to the timing generator 12.

The timing generator 12 generates the reference carrier signal (cos(ωt)) synchronized with the input wobble signal. The timing generator 12 also generates a clear (CLR) signal and a hold (HOLD) signal from the wobble-clocks. The clear (CLR) signal is generated at a timing delayed by one-half wobble period from the leading edge of a data clock of the data for modulation the minimum code length of which is two wobble periods. The hold signal (HOLD) is a signal generated at a timing delayed one-half wobble period from the end edge of the data clock of the data for modulation. The reference carrier signal (cos(ωt)), generated by the timing generator 12, is sent to the multiplier 13. The generated clear signal (CLR) is sent to the integrator 14, while the generated hold signal (HOLD) is sent to the sample-and-hold circuit 15.

The multiplier 13 multiplies the input wobble signal with the reference carrier signal (cos(ωt)) to execute synchronous detection. The synchronous detected output signal is sen to the integrator 14.

The integrator 14 integrates the synchronous detected signal by the multiplier 34. Meanwhile, the integrator 14 clears the integrated value to zero at a generating timing of the clear signal (CLR) produced by the timing generator 12.

The sample-and-hold circuit 15 samples the integrated output value of the integrator 14 at a generating timing of the hold signal (HOLD) produced by the timing generator 12 to hold the sampled value until generation of the next hold signal (HOLD).

The slicing circuit 16 binary-encodes the value held by the sample-and-hold circuit 15, with-a point of origin (0) as a threshold value, and inverts the sign of the encoded value to output the resulting signal.

The output signal of the slicing circuit 16 becomes the data for modulation of the data for modulation.

Figure 6:
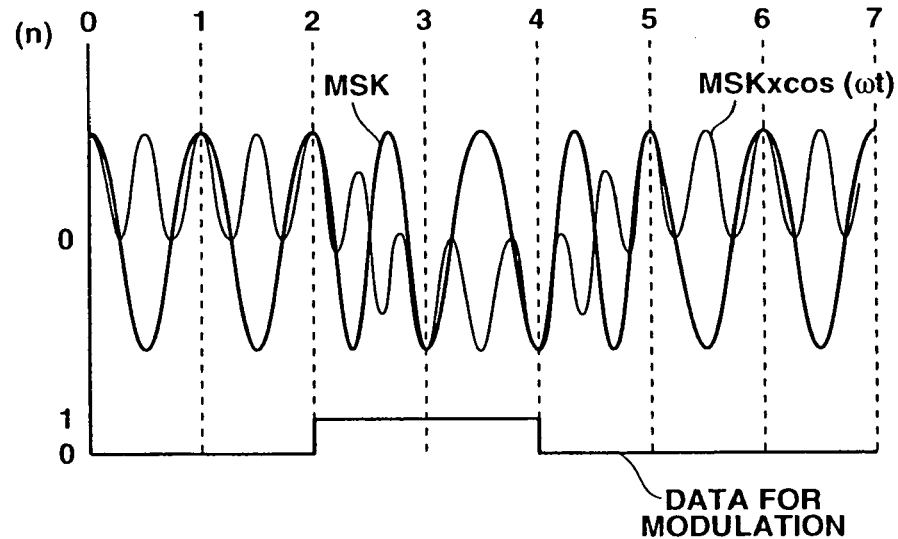
FIG. 6 shows an input wobble signal (MSK stream) and a synchronous-detected output signal (MSK×cos(ωt)) of the wobble signal.
Figure 7:
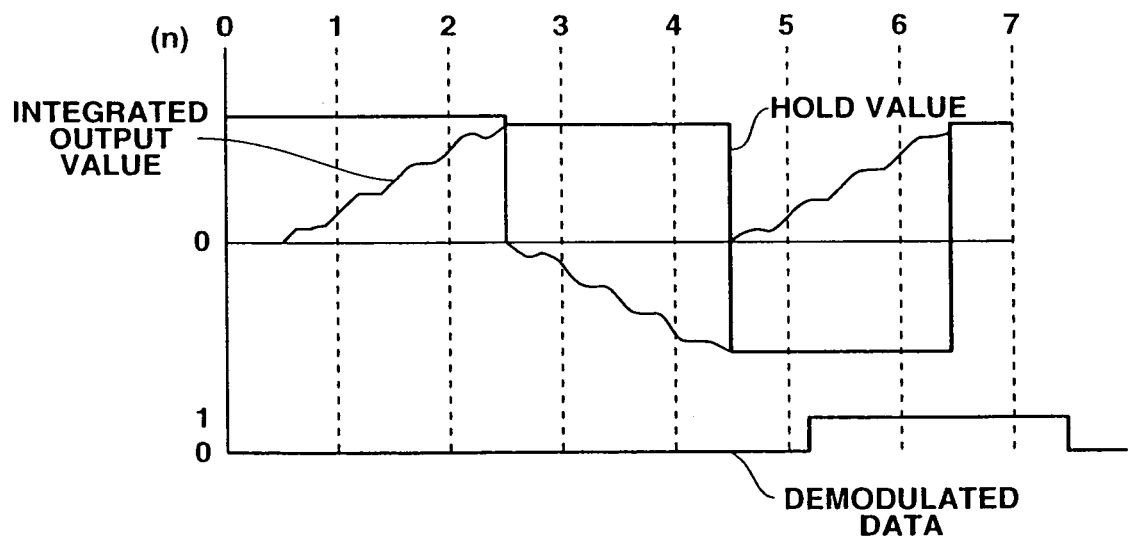
FIG. 7 shows an integrated output value of the synchronous detection output signal of the MSK stream, a hold value of the integrated output value and data for modulation obtained on MSK demodulation.

FIGS. 6 and 7 show the wobble signal (MSK stream) generated on MSK modulation of a data string "0100" as data for modulation and output signal waveforms of respective circuits of the MSK demodulating circuit 10 when the wobble signal is fed to this MSK demodulating circuit 10. In FIGS. 6 and 7, the abscissa (n) denotes the period numbers of the wobble periods. FIG. 6 shows the input wobble signal (MSK stream) and the synchronous detection output signal of the wobble signal (MSK×cos(ωt)). FIG. 7 shows an integrated output value of the synchronous detected output signal, a sample-held value of the integrated output value and the data for modulation output demodulated from the slicing circuit 16. Meanwhile, the data for modulation of the data for modulation, output from the slicing circuit 16, is delayed because of the processing delay caused in the integrator 14.

If the data for modulation is differential-encoded and subjected to the above-described MSK-modulation, synchronous detection of the data for modulation becomes possible, as described above.

In the present optical disc 1, the address information, MSK-modulated as described above, is formed into the wobble signal. By MSK modulating the address information and by having the so modulated address information formed into the wobble signal, the content of harmonics in the wobble signal is decreased, thus enabling accurate address detection. Moreover, since the MSK modulated address information is inserted in the monotone wobble, the crosstalk given to the neighboring track, may be reduced thus improving the S/N ratio. In addition, in the present optical disc 1, since the MSK data for modulation may be demodulated on synchronous detection, the wobble signal can be demodulated correctly and readily.

1-3 HMW Modulation

The modulation system for the address information, employing the HMW modulation system, is hereinafter explained.

The HMW modulation system is such a system in which signals of even harmonics are added to the sinusoidal carrier signal and in which the polarity of the even harmonics signal is varied depending on the sign of the data for modulation to modulate the digital code.

With the present optical disc 1, the carrier signal of the HMW modulation is the signal of the same frequency and phase as those of the reference carrier signal (cos(ωt)) which is the carrier signal used in the above-described MSK modulation. The even harmonics signals to be added are sin(2ωt) and −sin(2ωt) as second harmonics of the reference carrier signal (cos(ωt)), with the amplitudes thereof being −12 dB with respect to the amplitude of the reference carrier signal. The minimum code length of the data for modulation is twice the wobble period (period of the reference carrier signal).

If the sign of the data for modulation is "1", sin(2ωt) is added to the carrier signal, whereas, if the sign of the data for modulation is "0", −sin(2ωt) is added to the carrier signal, for modulation.

Figure 8A:
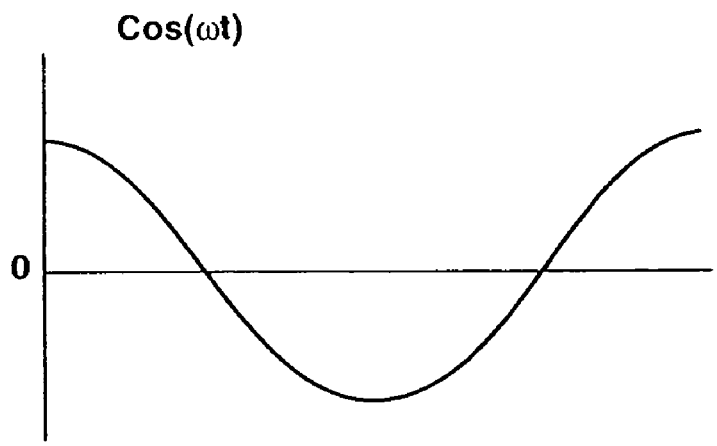
FIGS. 8A to 8C illustrate HMW modulation.
Figure 8B:
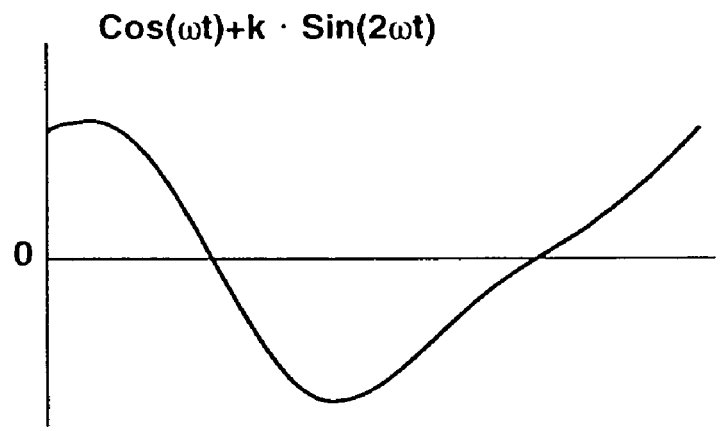
Figure 8C:
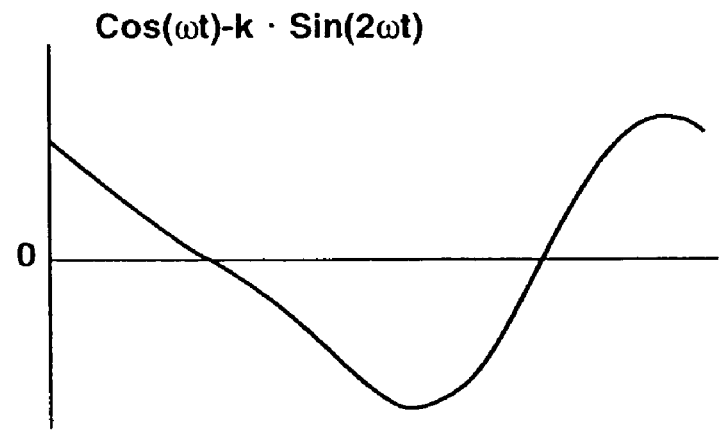

FIG. 8 shows the signal waveform in case the wobble signal is modulated by the above-described system. FIG. 8A shows the signal waveform of the reference carrier signal (cos(ωt)), while FIG. 8B shows the signal waveform obtained on adding sin(2ωt) to the reference carrier signal (cos(ωt)), that is the signal waveform in case the data for modulation is "1". FIG. 8C shows the signal waveform obtained on adding −sin(2ωt) to the reference carrier signal (cos(ωt)), that is the signal waveform in case the data for modulation is "0".

In the present optical disc 1, the harmonics signal added to the carrier signal is second harmonics. However, any optional even harmonics may be added in place of the second harmonics. Moreover, although only the second harmonics are added in the present optical disc 1, plural harmonics signals, such as second and fourth harmonics may be added simultaneously.

If the positive or negative even harmonics are added to the reference carrier signal, as described above, the data for modulation can be demodulated, by synchronous detection with the harmonics signals and by integration of the synchronous-detected output for the code length time of the data for modulation.

Figure 9:
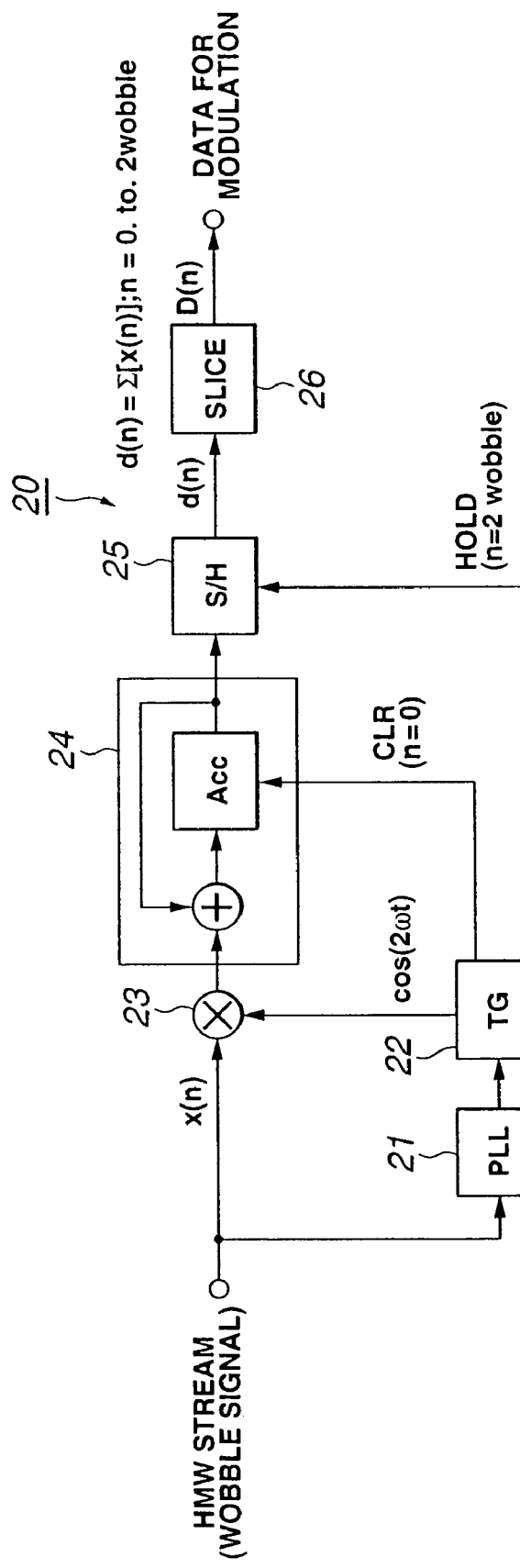
FIG. 9 shows a HMW demodulation circuit for demodulating HMW modulated wobble signal.

FIG. 9 shows an HMW modulation circuit for demodulating the data for modulation from the wobble signal HMW modulated as described above.

An HMW demodulating circuit 20 includes a PLL circuit 21, a timing generator (TG) 22, a multiplier 23, an integrator 24, a sample-and-hold circuit (SH) 25 and a slicing circuit 26, as shown in FIG. 9.

The PLL circuit 21 is fed with a wobble signal (HMW modulated stream). The PLL circuit 21 detects edge components from the input wobble signal to generate wobble clocks synchronized with the reference carrier signal (cos (ωt)). The so generated wobble clocks are sent to the timing generator 22.

The timing generator 22 generates second harmonics signal (sin(2ωt)) synchronized with the input wobble signal. The timing generator 22 also generates a clear signal (CLR) and a hold signal (HOLD). The clear signal (CLR) is a signal generated at a timing of a rising edge of a data clock of the data for modulation having two wobble periods as its minimum code length. The hold signal (HOLD) is a signal generated at the falling edge of the data clock of the data for modulation. The second harmonics (sin(2ωt)), produced by the timing generator 22, is sent to the multiplier 23. The clear signal (CLR) generated is routed to the integrator 24, while the hold signal (HOLD) generated is sent to the sample-and-hold circuit 25.

The multiplier 23 multiplies the input wobble signal with the second harmonics (sin(2ωt)) to perform synchronous detection. The synchronous-detected output signal is sent to the integrator 24.

The integrator 24 integrates the signal synchronous-detected by the multiplier 23. Meanwhile, the integrator 24 clears the integrated value to zero at a generating timing of the clear signal (CLR) by the timing generator 22.

The sample-and-hold circuit 25 samples the integrated output value of the integrator 24 at a generating timing of the hold signal (HOLD) produced by the timing generator 22 to hold the sampled value until generation of the next hold signal (HOLD).

The slicing circuit 26 binary-encodes the value held by the sample-and-hold circuit 25, with a point of origin (0) as a threshold value, and outputs the resulting encoded signal.

The output signal of the slicing circuit 26 becomes the data for modulation of the data for modulation.

Figure 10:
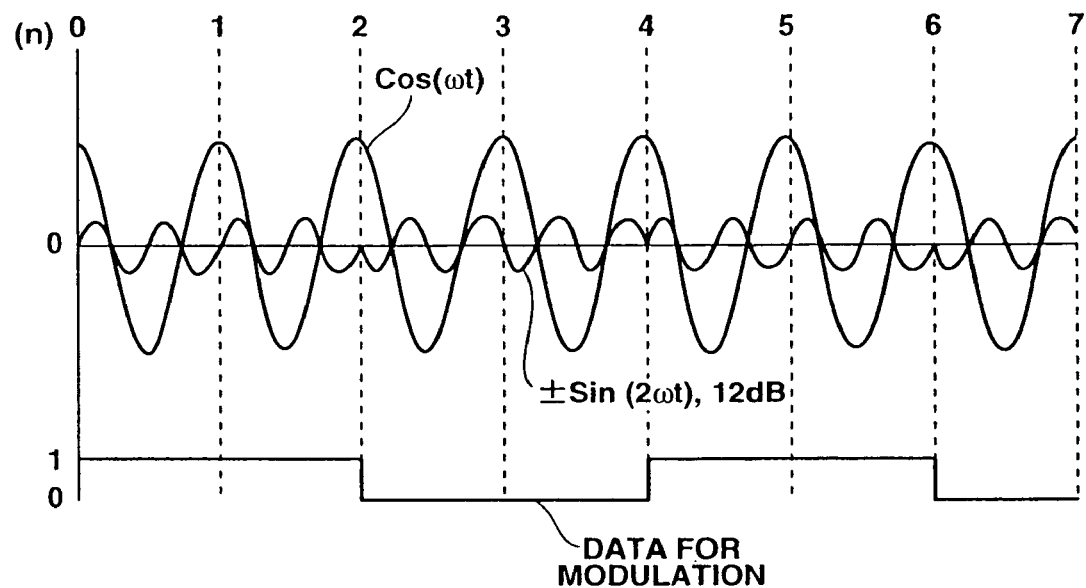
FIG. 10 shows a reference carrier signals (cos(ωt)), a data string "1010" as data for modulation and a signal waveform of second harmonics (±sin(2ωt), −12 dB) generated in meeting with the data for modulation.
Figure 11:
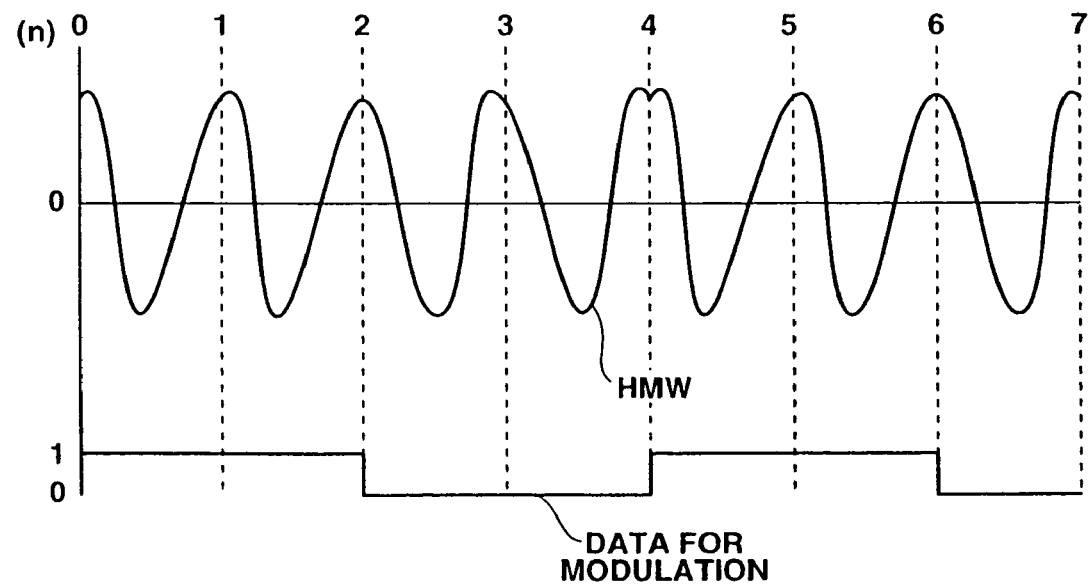
FIG. 11 shows the generated wobble signal (HMW stream).
Figure 12A:
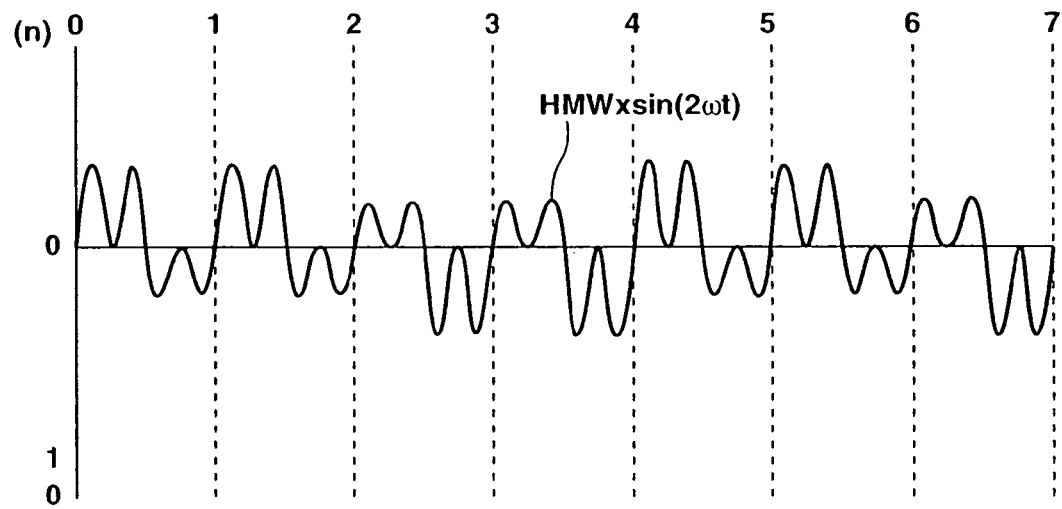
FIGS. 12A and 12B illustrate a synchronous-detected output signal of an HMW stream (HMW×sin(2ωt)), an integrated output value of the synchronous-detected output signal, a sample-held value of the integrated output value and HMW data for modulation.
Figure 12B:
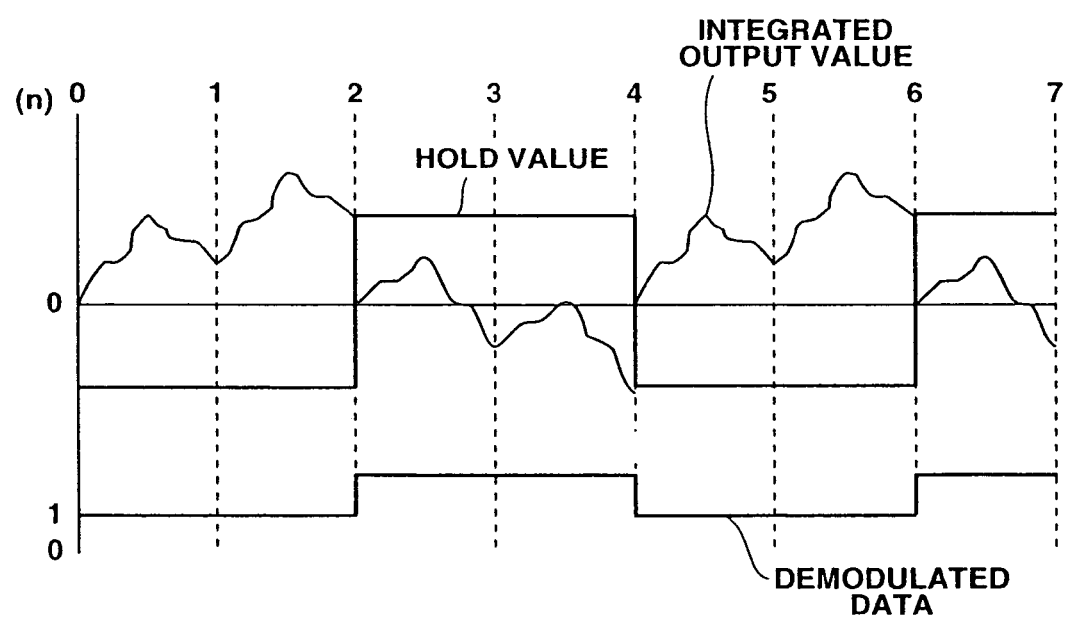

FIGS. 10 to 12 show a signal waveform used in HMW modulating a data string "1010" as data for modulation, a wobble signal generated on HMW modulation and output signal waveforms from respective circuits in case the wobble signal is fed to the HMW demodulating circuit 20. In FIGS. 10 to 12, the abscissa (n) denotes the period numbers of the wobble periods. FIG. 10 shows the reference carrier signal (cos(ωt)), a data string "1010" as data for modulation and second harmonics signal waveforms (±sin (2ωt), −12 dB) generated in meeting with the data for modulation. FIG. 11 shows the generated wobble signal (HMW stream). FIG. 12A shows the synchronous-detected output signal of the wobble signal (HMW×sin(2ωt)), whilst FIG. 12B shows an integrated output value of the synchronous-detected output signal, a sample-held value of the integrated output and data for modulation output from the slicing circuit 26. Meanwhile, the data for modulation, output from the slicing circuit 26, is delayed because of the first order delay caused in the integrator 14.

If the data for modulation is differential-encoded and MSK-modulated as described above, synchronous detection of the data for modulation becomes possible.

In the present optical disc 1, the address information, HMW-modulated as described above, is formed into the wobble signal. By HMW modulating the address information, and by having the so modulated address information formed into the wobble signal, it is possible to limit frequency components and the reduce high harmonics components. The result is that the S/N ratio of the demodulated output of the wobble signal can be improved and addresses can be detected correctly. Moreover, the modulating circuit can be constructed by a carrier signal generating circuit, a circuit for generating its harmonics components and a circuit for summing the outputs of these circuits, and thus may be simpler in structure. Additionally, the high frequency components of the wobble signal can be reduced to facilitate cutting in molding an optical disc.

Since the HMW modulated address information is inserted into the monotone wobble, it is possible to reduce the crosstalk applied to the neighboring tracks to improve the S/N ratio. Moreover, in the present optical disc, since the HMW data for modulation can be demodulated on synchronous detection, the wobble signal can be demodulated accurately and extremely readily.

1-4 Sum

In the present embodiment of the optical disc, described above, the MSK modulation system and the HMW modulation system are used as the modulation systems for modulating the wobble signal with the address information. In the present optical disc 1, one of the frequencies used in the MSK modulation system and the carrier frequency used in the HMW modulation are the sinusoidal signal of the same frequency (cos(ωt)). Moreover, the monotone wobble including only the carrier signal (cos(ωt)), and which is free of data for modulation, is provided between respective modulated signals in the wobble signal.

In the above-described optical disc 1, there is no interference produced between the signal of the frequency used in MSK modulation and the harmonics used for HMW modulation, so that, in detection, the respective modulation components are not affected by counterpart modulation components. Thus, the respective address information, recorded by the two modulation systems, can be detected reliably. The result is the improved accuracy in controlling e.g., the track positions in recording and/or reproducing the optical disc.

If the address information recorded by MSK modulation is of the same data contents as the address information recorded by HMW modulation, the address information can be detected more reliably.

Moreover, in the present optical disc 1, since one of the frequencies used in the MSK modulation system and the carrier frequency used in the HMW modulation are the same frequency of the sinusoidal signals (cos(ωt)), and the MSK modulation and the HMW modulation are applied to different portions in the wobble signal, it is sufficient in modulation if harmonics signals for HMW modulation are added to a wobble position of the MSK modulated wobble signal which is intended for HMW modulation, thus assuring highly facilitated MSK and HMW modulations. Moreover, since the MSK modulation and the HMW modulation are applied to different portions in the wobble signal and at least one period of the monotone wobble is provided between the two modulations, it is possible to realize more accurate disc manufacture and more reliable address demodulation.

2. Instance of Application to DVR

An instance of application of the aforementioned address format to a high density optical disc termed DVR (data and video recording) is hereinafter explained.

2-1 Physical Characteristics of DVR Disc

First, typical physical parameters of a DVR disc, to which the present address format is applied, are explained. Meanwhile, these physical parameters are merely illustrative such that the wobble format now explained may also be applied to an optical disc of any other suitable physical characteristics.

The DVR disc of the present embodiment is an optical disc for recording data in accordance with the phase change system. The disc size is 120 mm in diameter, with the disc thickness being 1.2 mm.

The area on the disc is composed of a lead-in area, a program area and a lead-out area, looking from the inner peripheral side. The information area, made up of these areas, is formed at a diametrical position ranging from. 44 mm to 117 mm.

For recording and/or reproduction, the so-called blue laser light of 405 nm is used. The NA of a lens is 0.85, with the track pitch being 0.30 μm, a channel bit length being 0.086 μm and a data bit length being 0.13 μm. The average transfer rate of the user data is 35 Mbits/sec.

The user data capacity is 22.46 Gbytes.

Data recording is by a groove recording system. That is, a track is formed at the outset on the disc by a groove, on which recording is to be made. This groove is wobbled to record the address information of the present disc.

2—2 Format of Data for Recording and/or Reproduction

Figure 13:
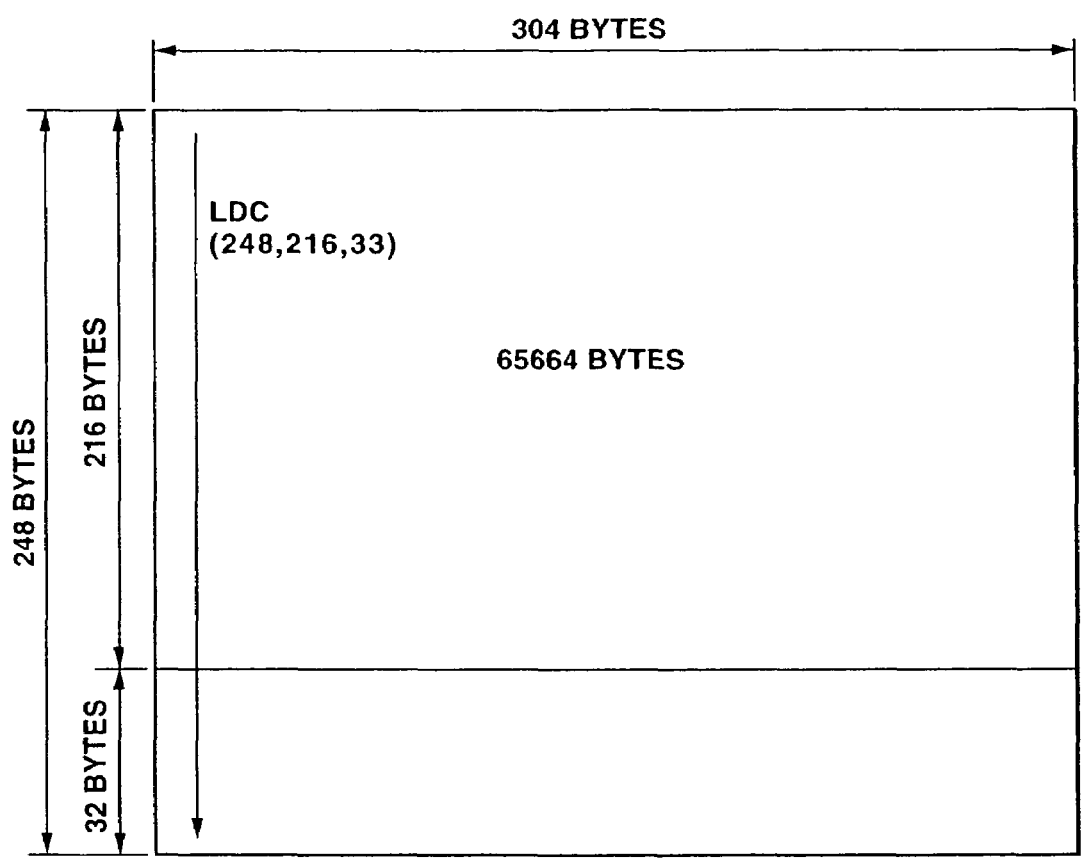
FIG. 13 shows an error correction block of a DVR disc embodying the present invention.

The error correction block (ECC block) of phase change data of the present embodiment of the DVR disc is 64 kbytes (304 bytes×248 bytes), as shown in FIG. 13. This ECC block is made up of 304 rows by 216 columns of data, and 304 rows by 32 columns of parity, with one symbol being one byte. The parity is generated by long distance Reed-Solomon coding of LDC (248, 216, 33) of 304 rows by 216 columns of data with respect to the column direction.

Meanwhile, in the present embodiment of the DVR disc, the recording and/or reproducing unit of the phase change data may be 2 k bytes. In this case, recording and/or reproduction is performed with the aforementioned 64 kbytes of the error correction block, and data rewriting is performed on desired 2 k bytes of the error correction block.

Figure 14:
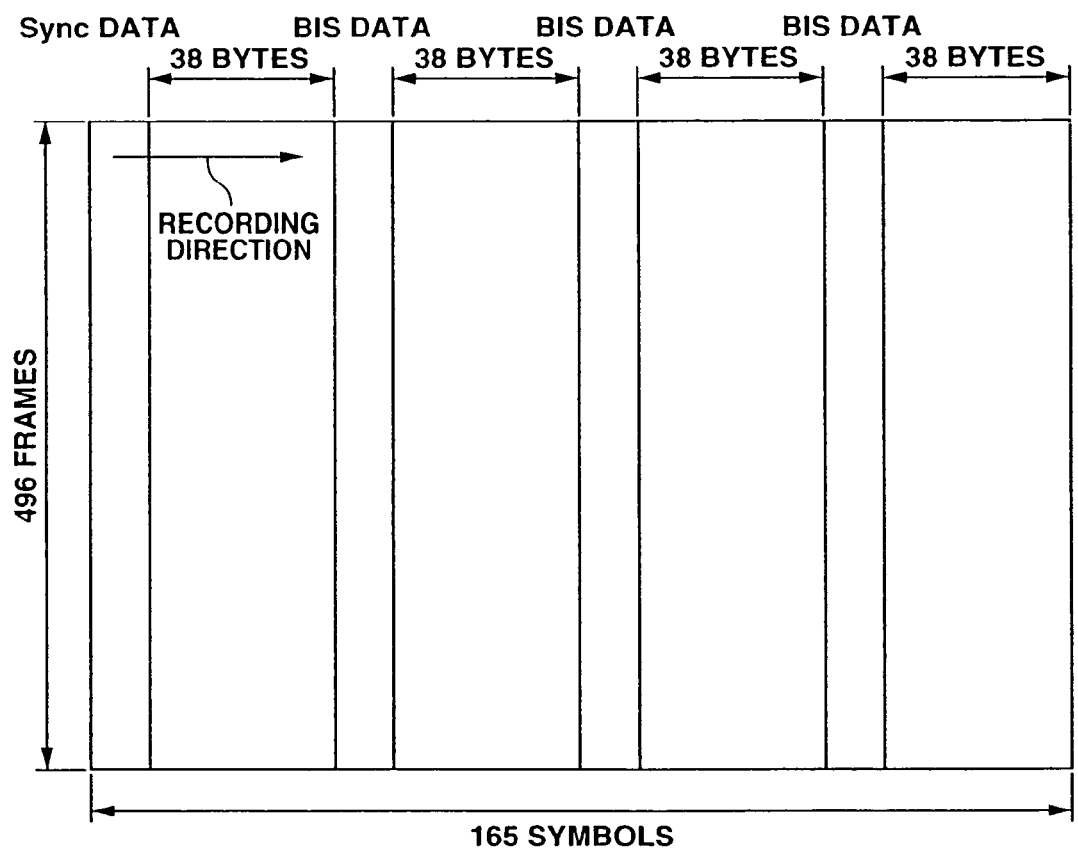
FIG. 14 shows an ECC cluster of the DVR disc.

Turning to the recording and/or reproducing unit of the present embodiment of the DVR disc, the ECC block is an ECC block cluster of 156 symbols by 496 frames, as shown in FIG. 14, and a one-frame link area for e.g., PLL is appended to each of the leading and trailing sides of the ECC block cluster to form a sum total of 498 frames of the recording and/or reproducing cluster. This recording and/or reproducing cluster is termed an RUB (recording unit block).

Each frame of each ECC block cluster is made up of data symbols, split in terms of 38 bytes as a unit, and Sync codes or BIS (burst sindicator subcode) inserted between the respective data symbols. Specifically, each frame is made up of a Sync code, a data symbol (38 bytes), BIS, a data symbol (38 bytes), BIS, a data symbol (38 bytes), BIS, a data symbol (38 bytes), in this order, looking from the leading side. The BIS and Sync codes may be used for discriminating burst errors in data reproduction. That is, if the continuous Sync and BIS represent symbol errors, the 38 bytes of the data symbol, sandwiched by the Sync and BIS, corrupted with errors, is also deemed to be corrupted with burst errors, and pointer erasure correction is performed accordingly.

Figure 15:
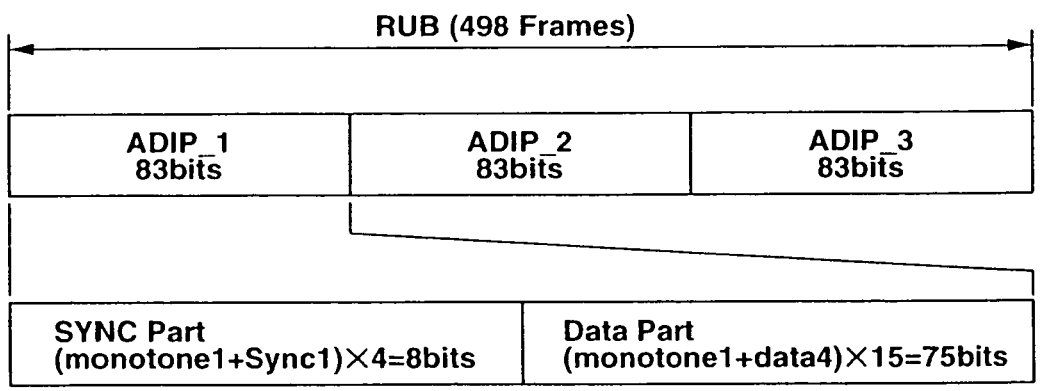
FIG. 15 shows the relationship between a recording and/or reproducing cluster (RUB) and an address unit of the DVR disc.

2-3 Address Format 2-3-1 Relationship between Data for Recording and/or Reproduction and Addresses In the present address format, the sole RUB (498 frames) is managed by three address units (ADIP_1, ADIP_2 and ADIP_3), recorded as wobble, as shown in FIG. 15. That is, a sole RUB is recorded for these three address units.

Figure 16:
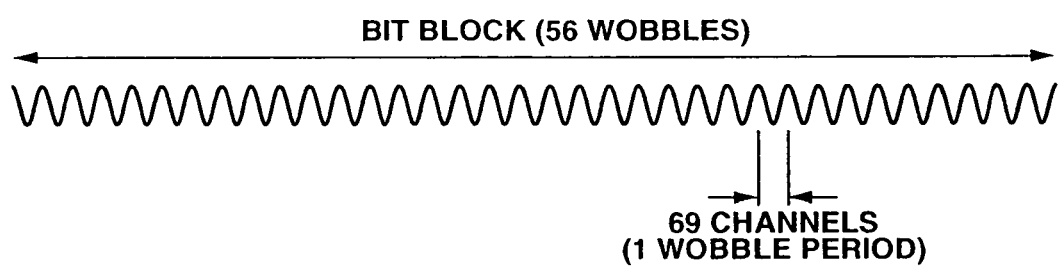
FIG. 16 shows a bit block forming the address unit.

In the present address format, the sole address unit is formed by an 8-bit sync part and 75 bits of a data part, totaling at 83 bits. In the present address format, the reference carrier signal of the wobble signal recorded on the pre-groove is the cosine signal (cos(ωt)), with one bit of the wobble signal being formed by 56 periods of the reference carrier signal, as shown in FIG. 16. The 'bit' herein means one bit of the information represented by the wobble signal. Thus, the length of one period of the reference carrier signal (one wobble period) is 69 times one channel length of the phase change. The 56 periods of the reference carrier signal forming one bit is referred to below as a bit block.

2-3-2 Sync Part

Figure 17:
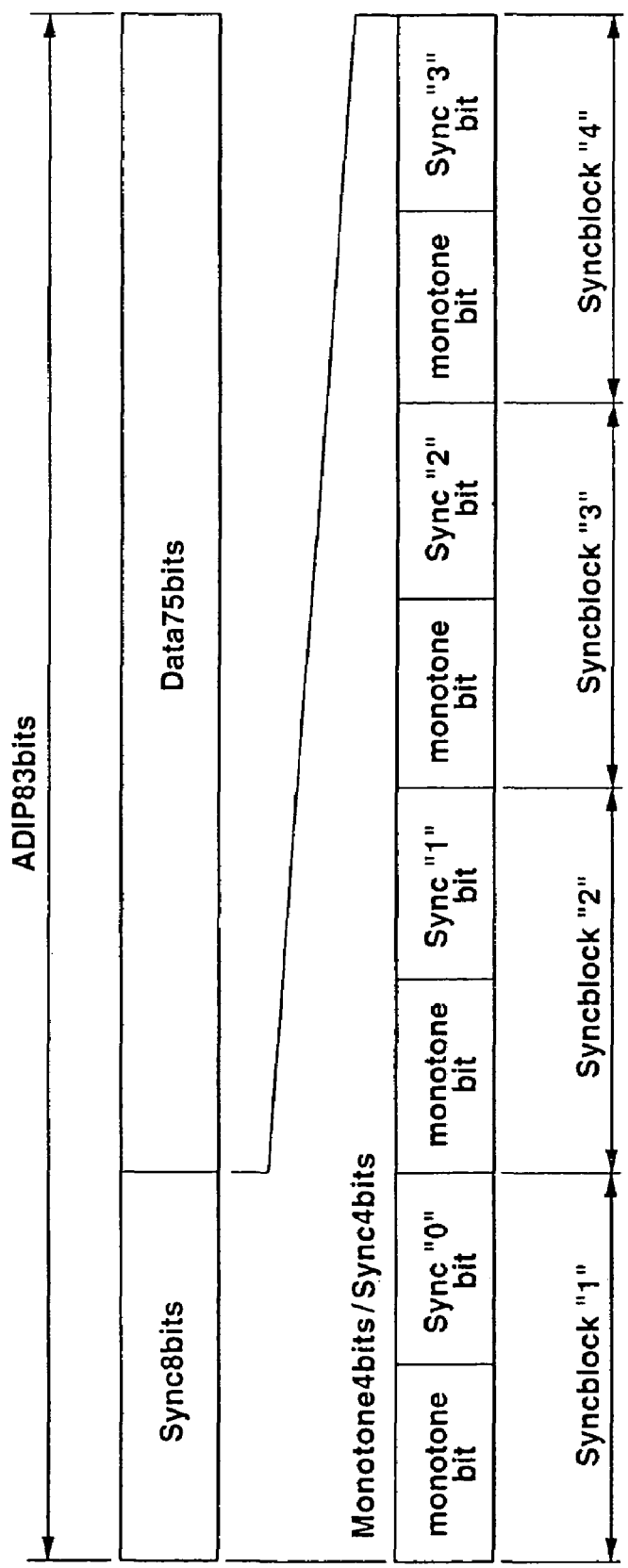
FIG. 17 shows a bit structure of a sync part in the address unit.

FIG. 17 shows a bit configuration of the sync part in the address unit. The sync part is a portion for identifying the leading end of an address unit and is made up of four, namely first to fourth sync blocks (sync block "1," sync block "2," sync block "3" and sync block "4"). Each sync block is formed by a monotone bit and a sync bit, totaling to two bit blocks.

Figures 18A, 18B:
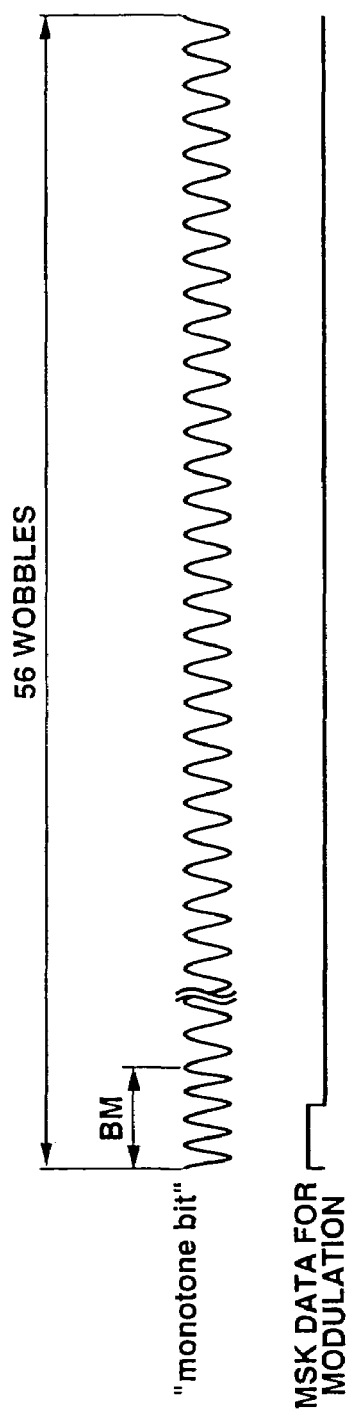
FIGS. 18A and 18B show a signal waveform of a monotone bit in the sync part and data for modulation

Turning to the signal waveform of the monotone bit, shown in FIG. 18A, the first to third wobbles of the bit block made up of 56 wobbles represent a bit synchronization mark BM, with the fourth to 56th wobbles as from the synchronization mark BM being monotone wobbles (signal waveform of the reference carrier signal (cos(ωt)).

The bit synchronization mark BM is a signal waveform obtained on MSK modulating the data for modulation of a predetermined code pattern designed for discriminating the leading end of a bit block. That is, this bit synchronization mark BM is a signal waveform generated on differential encoding of data for modulation of a predetermined code pattern and assigning the frequency depending on the sign of the differential encoded data. Meanwhile, the minimum code length L of the data for modulation is two wobble periods. In the present embodiment, the signal waveform obtained on MSK modulating the data for modulation with one bit (two wobble periods) of "1" is recorded as the bit synchronization mark BM. That is, this bit synchronization mark BM is a signal waveform continuous, in terms of a wobble period as a unit, as "cos(1.5ωt), −cos(ωt) and −cos(1.5ωt)".

So, the monotone bit can be generated by generating data for modulation such as "10000 . . . 00", with the code length being two wobble periods, and by MSK modulating this data for modulation, as shown in FIG. 18B.

It should be noted that the bit synchronization mark BM is inserted not only at the leading end of the monotone bit of the sync part but also at the leading end of each of all bit blocks as now explained. Thus, during recording and/or reproduction, this bit synchronization mark BM may be detected and synchronized for synchronization of the bit blocks in the wobble signal, that is synchronization of the 56 wobble periods. Moreover the bit synchronization mark BM may be used as a reference for specifying the inserting positions in the bit block of various signals for modulation as hereinafter explained.

In the signal waveform of the sync bit of the first sync block (sync "0" bit), the first to third wobbles of the 56 wobbles making up a bit block represent the bit synchronization mark BM, and the 17th to 19th wobbles and the 27th to 29th wobbles thereof represent MSK modulation marks MM, with the waveform of the remaining wobbles being all monotone wobbles, as shown in FIG. 19A.

In the signal waveform of the sync bit of the second sync block (sync "1" bit), the first to third wobbles of the 56 wobbles making up a bit block represent the bit synchronization mark BM, and the 19th to 21st wobbles and the 29th to 31st wobbles thereof represent MSK modulation marks MM, with the waveform of the remaining wobbles being all monotone wobbles, as shown in FIG. 20A.

In the signal waveform of the sync bit of the third sync block (sync "2" bit), the first to third wobbles of the 56 wobbles making up a bit block represent the bit synchronization mark BM, and the 21st to 23rd wobbles and the 31st to 33rd wobbles thereof represent MSK modulation marks MM, with the waveform of the remaining wobbles being all monotone wobbles, as shown in FIG. 21A.

In the signal waveform of the sync bit of the fourth sync block (sync "3" bit), the first to third wobbles of the 56 wobbles making up a bit block represent the bit synchronization mark BM, and the 23rd to 25th wobbles and the 33rd to 35th wobbles thereof represent MSK modulation marks MM, with the waveform of the remaining wobbles being all monotone wobbles, as shown in FIG. 22A.

Similarly to the bit synchronization mark BM, the MSK modulation mark MM is a signal waveform generated on MSK modulating the data for modulation of a predetermined code pattern. That is, this MSK modulation mark MM is a signal waveform generated on differential encoding of data for modulation of a predetermined code pattern and on assigning the frequency depending on the sign of the differential-encoded data. Meanwhile, the minimum code length L of the data for modulation corresponds to two wobble periods. In the present instance, the signal waveform, obtained on MSK modulating the data for modulation, having one bit, corresponding to two wobble periods, set to "1", is recorded as the MSK modulation mark MM. That is, this MSK modulation mark MM is a continuous waveform, composed of "cos(1.5ωt), −cos(ωt) and −cos(1.5ωt)", in terms of one wobble period as a unit.

That is, the sync bit of the first sync block (sync "0" bit) can be generated on generating a data stream shown in FIG. 19B (with the code length being two wobble periods) and on MSK modulating the so generated data stream. Similarly, the sync bit of the second sync block (sync "1" bit), sync bit of the third sync block (sync "2" bit) and the sync bit of the fourth sync block (sync "2" bit) can be generated on generating the data stream shown in FIG. 20B and on MSK modulation thereof, on generating the data stream shown in FIG. 21B and on MSK modulation thereof and on generating the data stream shown in FIG. 22B and on MSK modulation thereof, respectively.

Meanwhile, the sync bit insertion pattern to a bit block of two MSK modulation marks MM is unique with respect to the insertion pattern of the MSK modulation marks MM in the remaining bit blocks. Thus, during recording and/or reproduction, the address unit can be synchronized by MSK demodulating the wobble signals, verifying the insertion pattern of the MSK modulation marks MM in the bit block and by discriminating at least one of the four sync bits, thereby achieving demodulation and decoding of the data part as now explained.

2-3-3 Data Part

Figure 23:
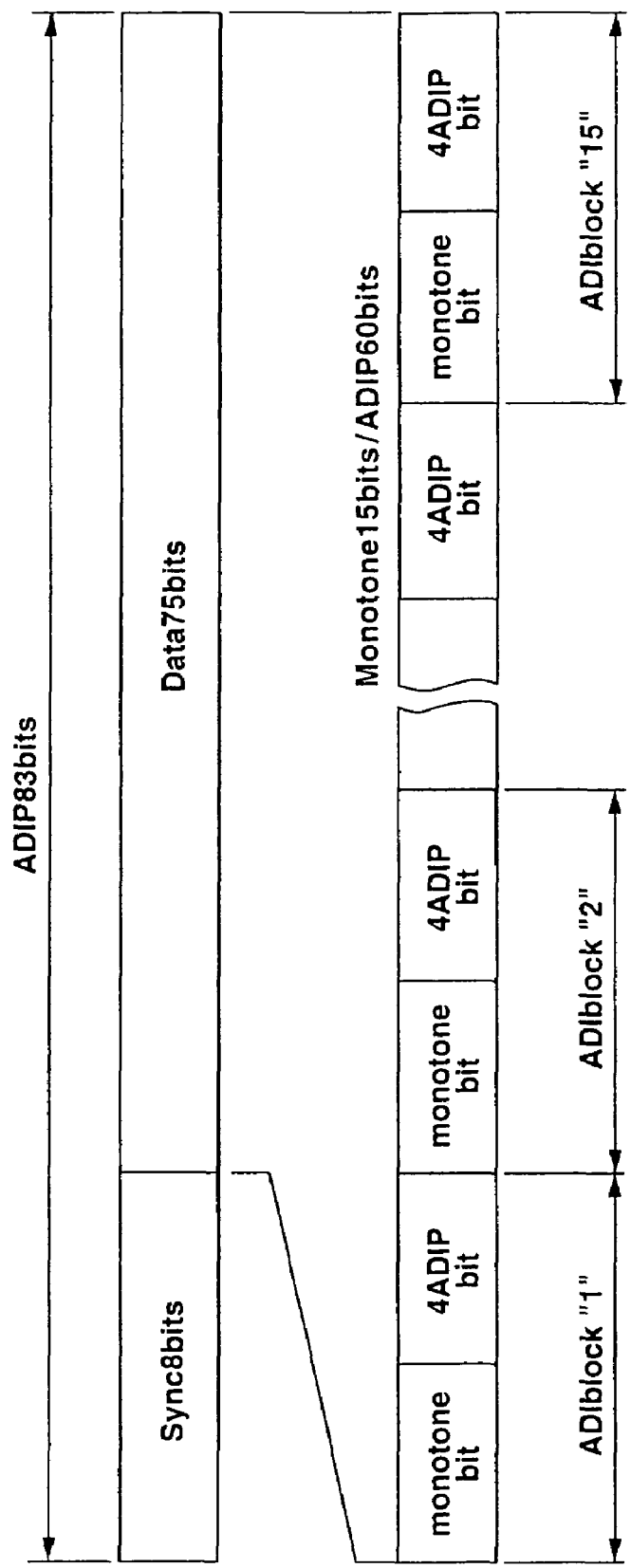
FIG. 23 shows a bit structure of a data part in the address unit.

FIG. 23 shows a bit configuration of the data part in the address unit. The data part holds real data of the address information and is made up of 15, namely the first to 15th ADIP blocks (ADIP block "1" to ADIP block "15"). Each ADIP block is made up of one monotone bit and four ADIP bits.

The signal waveform of the monotone bit is similar to that shown in FIG. 18.

The ADIP bit denotes one bit of real data. The signal waveform is changed with code contents of the real data bit.

Figure 24A:
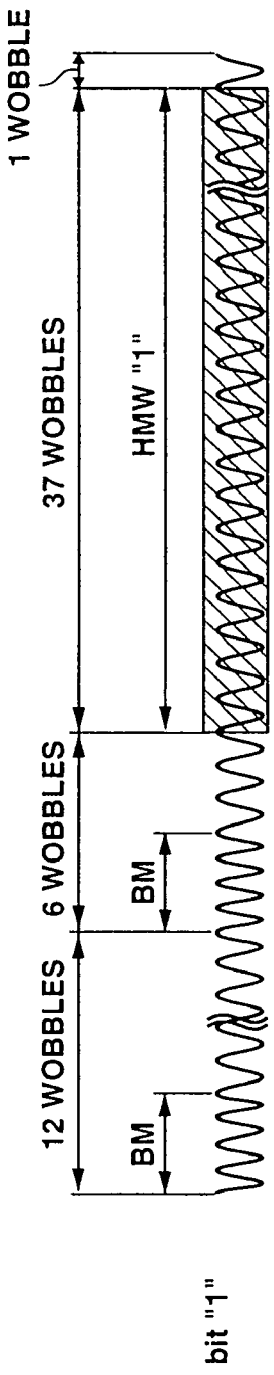

If the sign content, denoted by the ADIP bit, is "1", the first to third wobbles, the 13th to 15th wobbles and the 19th to 55th wobbles of the bit block, made up of 56 wobbles, become the bit synchronization mark BM, MSK modulation mark MM and the modulation part of HMW "1" composed of the reference carrier signal (cos(ωt)) and sin(2ωt) added thereto, respectively, with the waveform of the remaining wobbles being all monotone wobbles. That is, the ADIP bit, the sign content of which is "1", can be generated by generating data for modulation such as "100000100 . . . 00" with the code length being two wobble periods, MSK modulating the so generated data for modulation, as shown in FIG. 24B, and by adding sin(2ωt), with an amplitude equal to −12 dB, to the 19th to 55th wobbles of the MSK modulated signal waveform, as shown in FIG. 24C.

If the sign content denoting the ADIP bit is "0", the first to third wobbles, the 15th to 17th wobbles and the 19th to 55th wobbles of the bit block, made up of 56 wobbles, become bit synchronization mark BM, MSK modulation mark MM and the modulation part of HMW "0" composed of the reference carrier signal (cos(ωt)) and −sin(2ωt) added thereto, respectively, with the waveform of the remaining wobbles being all monotone wobbles. That is, the ADIP bit, the sign content of which is "0", can be generated by generating data for modulation such as "100000010 . . . 00" with the code length being two wobble periods, and MSK modulating the so generated data for modulation, as shown in FIG. 25B, and by adding −sin(2ωt), with an amplitude equal to −12 dB, to the 19th to 55th wobbles of the MSK modulated signal waveform, as shown in FIG. 25C.

The ADIP bit has its bit contents distinguished depending on the inserting positions of the MSK modulation mark MM. That is, if the MSK modulation mark MM is inserted at the 13th to 15th wobbles, it indicates a bit "1", whereas, if the MSK modulation mark MM is inserted at the 15th to 17th wobbles, it indicates a bit "0". Moreover, the ADIP bit denotes, by the HMW modulation, the same bit content as the bit content represented by the inserting position of the MSK modulation mark MM. Therefore, the ADIP bit denotes the same bit contents for the two different modulation systems, thus assuring reliable data decoding.

Figure 26:
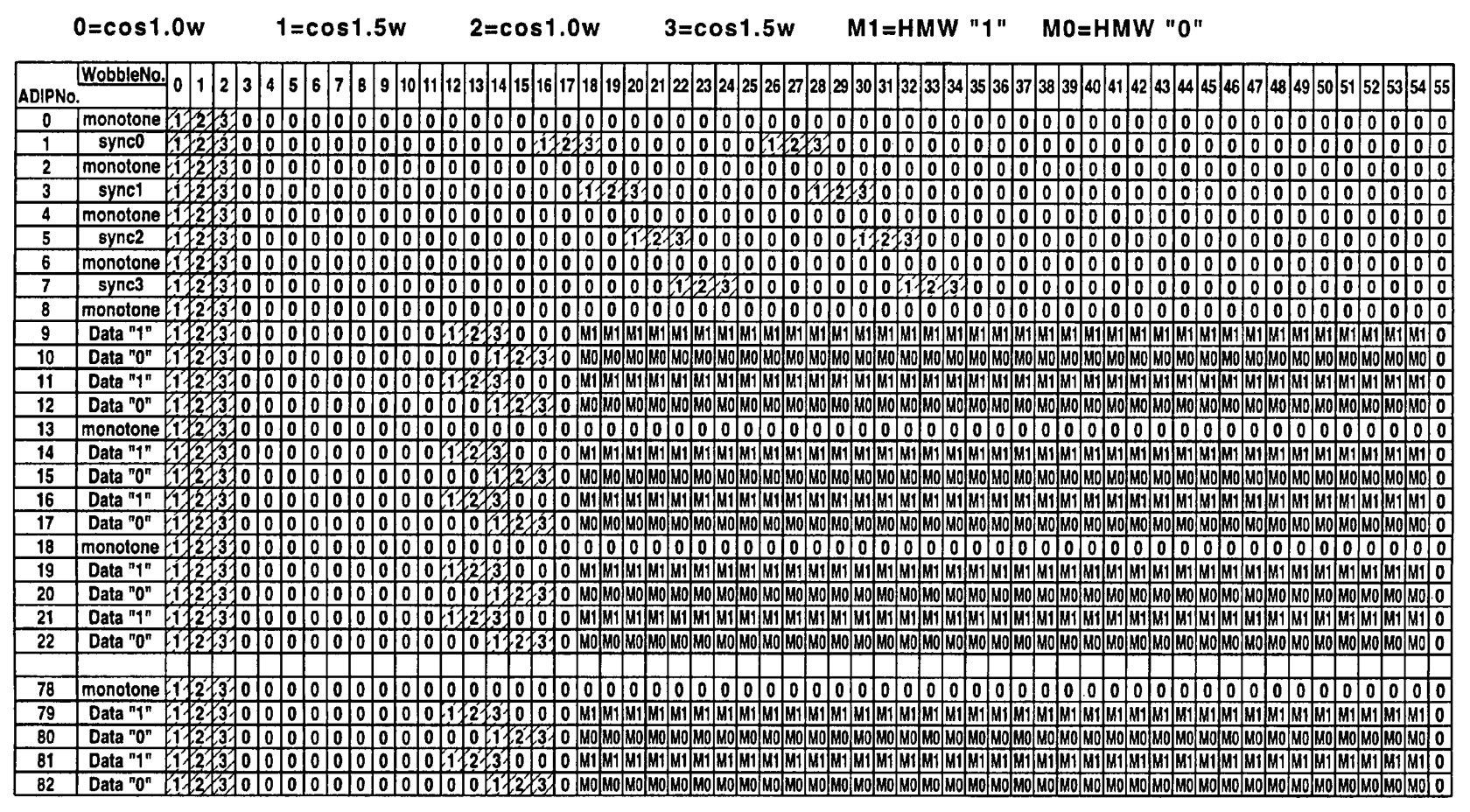

FIG. 26 shows the format of the address unit showing the above-described sync and data parts synthesized together.

In the address format of the present optical disc 1, the bit synchronization mark BM, the MSK modulation mark MM and the HMW modulating part are arranged discretely in one address unit, as shown in FIG. 26. Between the modulated signal portions is arranged at least one wobble period of the monotone wobble. As a result, there no risk of interference between respective modulation signals, thus assuring reliable demodulation of respective signals.

2-3-4 Contents of Address Information

FIG. 27 shows the contents of the address information represented by the ADIP bit in the data part. In one address unit, there are contained 60 (4×15) ADIP bits, such that there are shown information contents of 60 bits for a data string. This 60-bit address information is made up of a 3-bit layer information (Layer) indicating the layer numbers in case of multi-layered recording, a 19-bit RUB information (RUB) indicating the RUB address, 2-bit address number information (address number/RUB) indicating the numbers of the address units in the RUB, the 12-bit auxiliary information (Aux data) stating e.g., the recording conditions, such as recording patterns, and the 24-bit parity information (parity), as shown in FIG. 27.

The 24-bit parity is the so-called nibble base Reed-Solomon code, having 4 bits as one symbol (RS(15, 9, 7)). Specifically, error correction coding is performed with the code length of 15 nibbles, data of 9 nibbles and parity of 6 nibbles, as shown in FIG. 28.

2-4 Address Demodulating Circuit

An address demodulating circuit for demodulating the address information from the DVR disc of the aforementioned address format is hereinafter explained.

Figure 29:
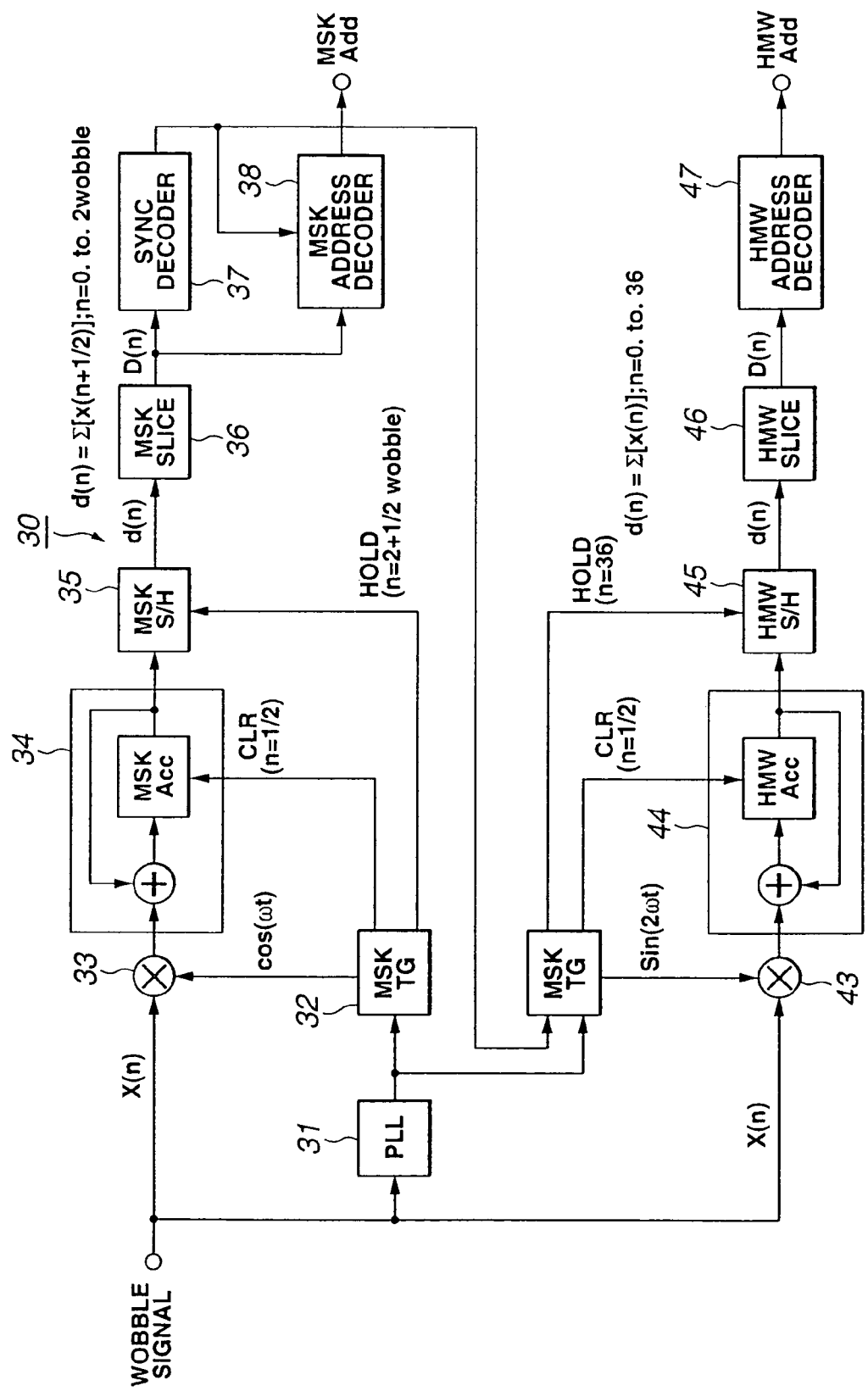
FIG. 29 shows an address demodulation circuit of the DVR disc.

FIG. 29 shows a block structure of an address demodulating circuit.

The address demodulating circuit 30 includes a PLL circuit 31, a timing generator for MSK 32, a multiplier for MSK 33, an integrator for MSK 34, a sample-and-hold circuit for MSK 35, a slicing circuit for MSK 36, a sync decoder 37, an MSK address decoder 38, a timing generator for HMW 42, a multiplier for HMW 43, an integrator for HMW 44, a sample-and-hold circuit for HMW 45, a slicing circuit for HMW 46 and an address decoder for HMW 47, as shown in FIG. 29.

The PLL circuit 31 is fed with the wobble signal reproduced from the DVR disc. The PLL circuit 31 detects edge components from the input wobble signal to generate wobble clocks synchronized with the reference carrier signal ($\cos(\omega t)$). The so generated wobble clocks are sent to the timing generator for MSK 32 and to the timing generator for HMW 42.

The timing generator for MSK 32 generates the reference carrier signal ($\cos(\omega t)$) synchronized with the input wobble signal. The timing generator for MSK 32 also generates a clear signal (CLR) and a hold signal (HOLD) from the wobble clocks. The clear signal (CLR) is such a signal generated at a timing delayed one-half wobble period as from the leading edge of the data clock of the data for modulation having the minimum code length equal to two wobble periods. The hold signal (HOLD) is such a signal generated at a timing delayed one-half wobble period as from the trailing edge of the data clock of the data for modulation. The reference carrier signal ($\cos(\omega t)$), generated by the timing generator for MSK 32, is sent to the multiplier for MSK 33. The generated clear signal (CLR) is sent to the integrator for MSK 34. The generated hold signal (HOLD) is sent to the sample-and-hold circuit for MSK 35.

The multiplier for MSK 33 multiplies the input wobble signal with the reference carrier signal ($\cos(\omega t)$) by way of performing synchronous detection processing. The synchronous-detected output signal is sent to the integrator for MSK 34.

The integrator for MSK 34 integrates the signal synchronous-detected by the multiplier for MSK 33. Meanwhile, the integrator for MSK 34 clears the integrated value to "0" at the generation timing of the clear signal (CLR) by the timing generator for HMW 42.

The sample-and-hold circuit for MSK 35 samples an integrated output value of the integrator for MSK 34, at a timing of generation of the hold signal (HOLD) by the timing generator for MSK 32, to hold the sampled value until occurrence of the next hold signal (HOLD).

The slicing circuit for MSK 36 binary-encodes the value held by the sample-and-hold circuit for MSK 35, with the point of origin (0) as a threshold value, and inverts the sign of the binary-coded value to output the resulting signal.

The output signal of the slicing circuit for MSK 36 becomes an MSK data for modulation stream.

The sync decoder 37 detects a sync bit in the sync part from the bit pattern of the data for modulation output from the slicing circuit for MSK 36. The sync decoder 37 synchronizes the address unit from the detected sync bit. Based on the synchronization timing of the address unit, the sync decoder 37 generates an MSK detection window, indicating the wobble position of the MSK data for modulation in the ADIP bit of the data part, and an HMW detection window indicating the wobble position of HMW data for modulation in the ADIP bit of the data part. The synchronization position timing of the address unit, detected from the sync bit, the timing of the MSK detection window and the timing of the HMW detection window, are shown in FIGS. 30A, 30B and 30C, respectively.

The sync decoder 37 sends the MSK detection window and the HMW detection window to the MSK address decoder 38 and to the timing generator for HMW 42, respectively.

The MSK address decoder 38, fed with a demodulated stream output from the slicing circuit for MSK 36, detects the inserting position of the MSK modulation mark MM in the ADIP bit of the data stream demodulated based on the MSK detection window to check the contents of the sign represented by the ADIP bit. That is, if the insertion pattern of the MSK modulation mark of the ADIP bit is a pattern shown in FIG. 24 or a shown in FIG. 25, the contents of the sign are verified to be "1" or "0", respectively. The bit string obtained from the results of check is output as the MSK address information.

The timing generator for HMW 42 generates the second harmonics ($\sin(2\omega t)$), synchronized with the input wobble signal. The timing generator for HMW 42 generates a clear signal (CLR) and a hold signal (HOLD) from the HMW detection window. The clear signal (CLR) is a signal generated at a timing of the leading edge of the HMW detection window. The hold signal (HOLD) is a signal generated at a timing of the end edge of the HMW detection window. The second harmonics ($\sin(2\omega t)$) generated by the timing generator for HMW 42 is sent to the multiplier for HMW 43. The clear signal (CLR) generated is sent to the integrator for HMW 44. The hold signal (HOLD) generated is sent to the sample-and-hold circuit for HMW 45.

The multiplier for HMW 43 multiplies the input wobble signal with the second harmonics (sin(2ωt)) by way of performing synchronous detection processing. The synchronous-detected output signal is sent to the integrator for HMW 44.

The integrator for HMW 44 performs integrating processing on the signal synchronous-detected by the multiplier for HMW 43. This integrator for HMW 44 clears the integrated value to "0" at a timing of generation of the clear signal (CLR) by the timing generator for HMW 42, and holds the sampled value until occurrence of the next hold signal (HOLD).

The sample-and-hold circuit for HMW 45 samples an integrated output value of the integrator for HMW 44 at a timing of generation of the hold signal (HOLD) by the timing generator for HMW 42, such as to hold the sampled value until occurrence of the next hold signal (HOLD). That is, the HMW data for modulation has 37 wobbles in one bit block, so that, if the clear (HOLD) signal is generated at n=0, n being the number of wobbles, as shown in FIG. 30D, the sample-and-hold circuit for HMW 45 samples the integrated values at n=36, as shown in FIG. 30E.

The slicing circuit for HMW 46 binary-encodes the value held by the sample-and-hold circuit for HMW 45, with the point of origin (0) as threshold value, to output the resulting binary-coded value.

An output signal of the slicing circuit for HMW 46 becomes the data for modulation stream.

The address decoder for HMW 47 verifies the contents of the code represented by each ADIP bit from the data for modulation stream. The bit string obtained from the verified result is output as the HMW address information.

Figure 31A:
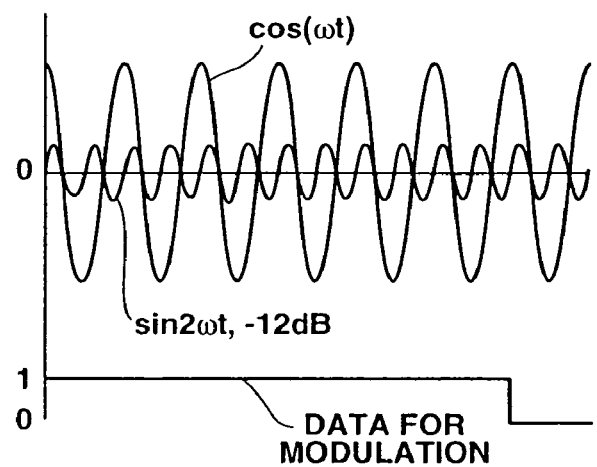
FIGS. 31A to 31C show a signal waveform on HMW demodulation of the ADIP bit with the code contents of "1" by the address demodulation circuit.
Figure 31B:
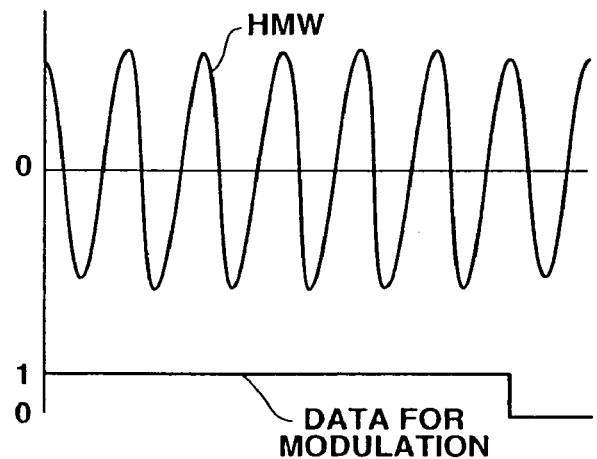
Figure 31C:
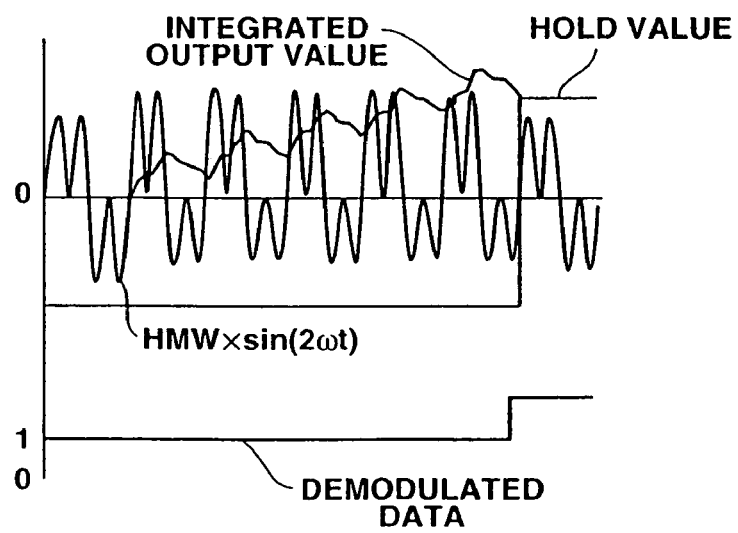

FIG. 31 shows the signal waveform when the ADIP bit with the code contents "1" is HMW demodulated by the HMW address decoder 47. The abscissa (n) of FIG. 31 shows the period numbers of the wobble periods. FIG. 31A shows the reference carrier signal (cos(ωt)), data for modulation having the code contents "1" and second harmonics signal waveforms (sin(2ωt), −12 dB), generated in meeting with the data for modulation. FIG. 31B shows generated wobble signal. FIG. 31C shows a synchronous-detected output signal (HMW×sin(2ωt)) of the wobble signal, an integrated output value of the synchronous-detected output signal, a sample-held value of the integrated output and the data for modulation output by the slicing circuit for HMW 46.

Figure 32A:
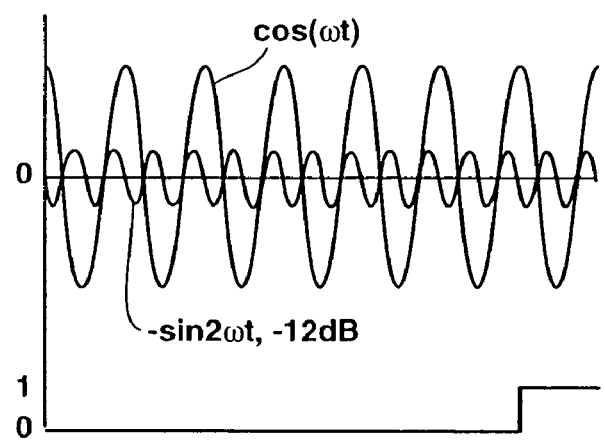
FIGS. 32A to 32C show a signal waveform on HMW demodulation of the ADIP bit with the code contents of "1" by the address demodulation circuit.
Figure 32B:
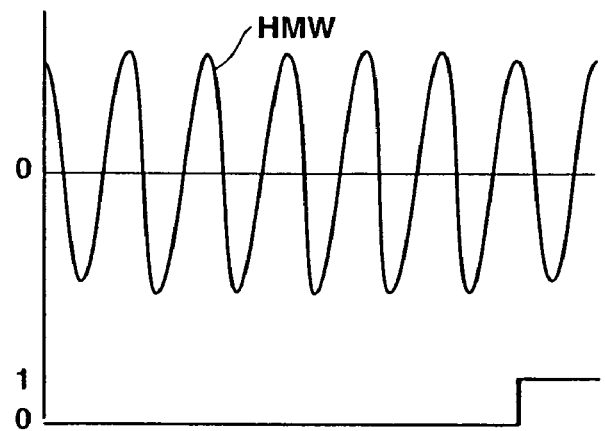
Figure 32C:
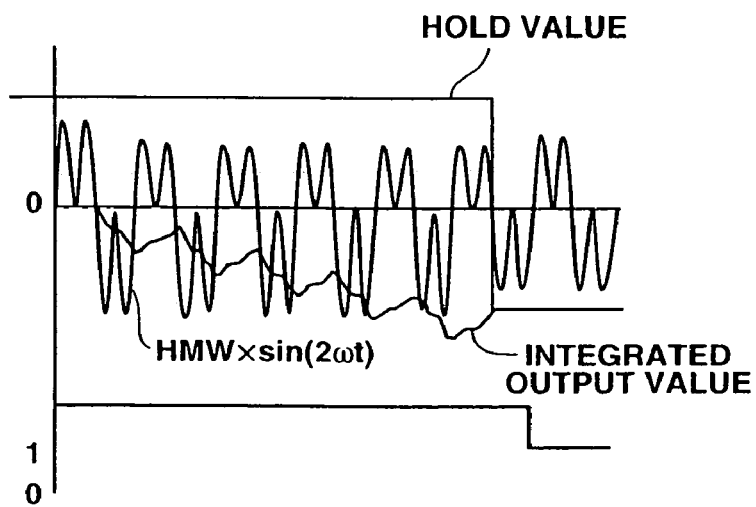

FIG. 32 shows the signal waveform when the ADIP bit with the code contents "0" is HMW demodulated by the HMW address decoder 47. The abscissa (n) of FIG. 32 shows the period numbers of the wobble periods. FIG. 32A shows the reference carrier signal (cos(ωt)), data for modulation having the code contents "1" and second harmonics signal waveforms (−sin(2ωt), −12 dB) generated in meeting with the data for modulation. FIG. 32B shows generated wobble signal. FIG. 32C shows a synchronous-detected output signal (HMW×sin(2ωt)) of the wobble signal, an integrated output value of the synchronous-detected output signal, a sample-held value of the integrated output and the data for modulation output by the slicing circuit for HMW 46.

As described above, the address decoder 47 detects the synchronization information of the address unit recorded by the MSK modulation and effects MSK demodulation and HMW demodulation based on the detection timing.

3. Illustrative Structure of Optical Disc Drive

An illustrative structure of an optical disc drive, configured for recording and/or reproducing data for a phase change optical disc, to which the above-described address format is applied, is now explained.

Figure 33:
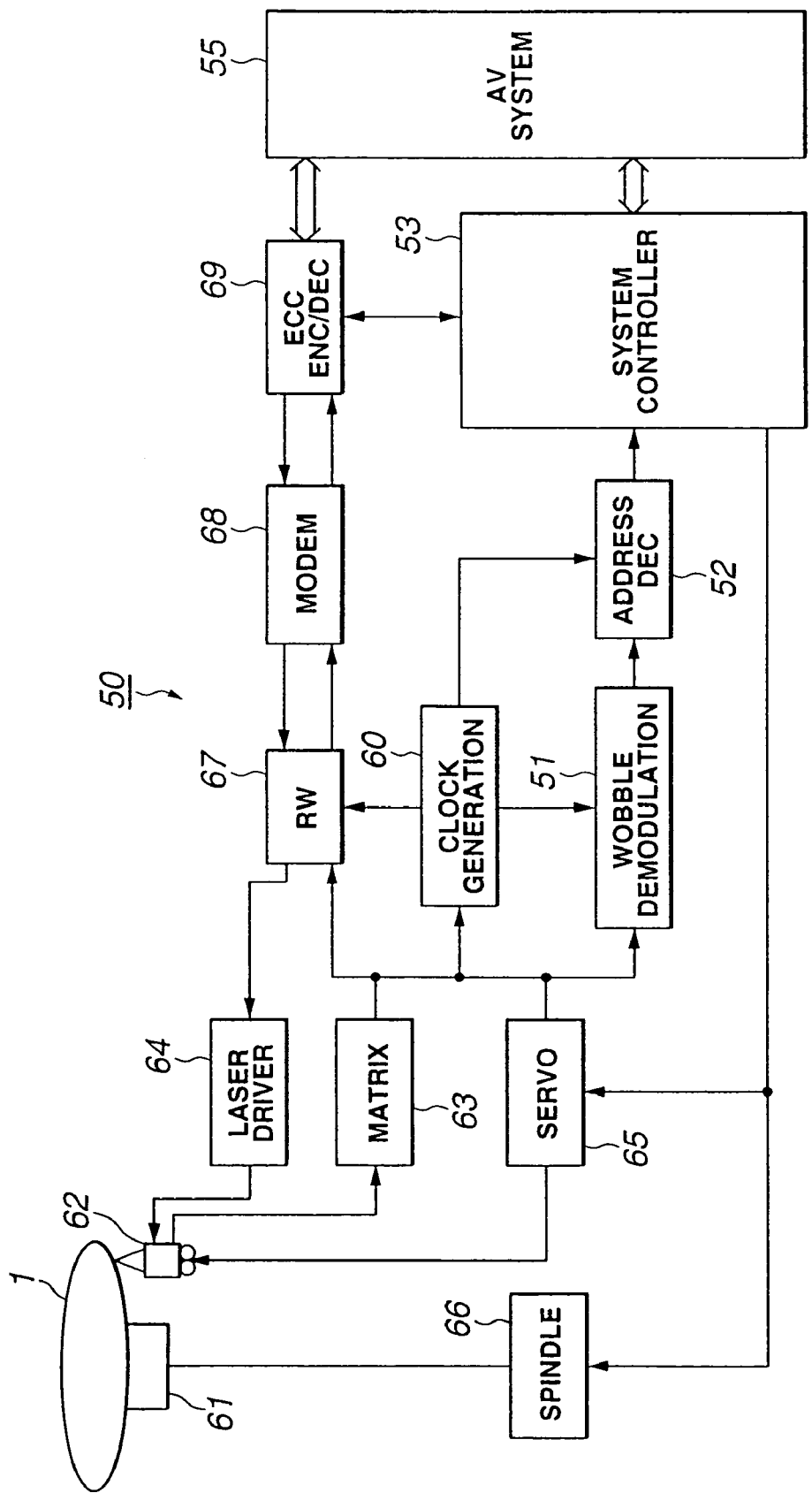
FIG. 33 shows a block structure of an optical disc drive embodying the present invention.

FIG. 33 shows a block diagram of the optical disc drive.

The optical disc 1, loaded on a turntable, is run in rotation by a spindle motor 61 at a constant linear velocity (CLV) at the time of recording and/or reproduction.

An optical head 62 includes a laser diode, as a laser light source, a photodetector for detecting the reflected light, an objective lens for converging the laser light on the disc, and a bi-axial unit for holding the objective lens for movement in the tracking and focussing directions.

A matrix circuit 63 generates playback signals, focussing error signals, tracking error signals and wobble signals (push-pull signals) from a signal detected by the photodetector of the optical head 62.

A laser driver 64 excites a laser diode in the optical head 62 to emit light.

A servo circuit 65 effects focussing servo control, tracking servo control and sled servo control, based on the focussing error signals, tracking error signals and the sled error signals, as detected by the matrix circuit 63.

A spindle circuit 66 runs the spindle motor 61.

A read-write (RW) circuit 67 performs recording compensation on the recording data during recording, while generating clocks from the replay signals during reproduction to binary-encode the replay signals based on the data clocks to generate replay data.

A modulation/demodulation circuit 68 performs modulation/demodulation processing, such as run length limited modulation/demodulation, on data for recording and/or reproduction.

An ECC encoder/decoder 69 performs ECC encoding or ECC decoding on the data for recording and/or reproduction.

A clock generator 60 generates clock timing signals from the wobble signal to send the so generated clock timing signals to the read-write circuit 67, a wobble demodulating circuit 51 and to an address decoder 52.

The demodulating circuit 51 demodulates data modulated into the wobble signal. The address decoder 52 decodes the address information of the optical disc 1 from the data for modulation of the demodulating circuit 51. The demodulating circuit 51 and the address decoder 52 may be configured as shown for example in FIG. 29.

A system controller 53 controls the various components making up the present optical disc drive 50.

In the above-described optical disc drive 50, recording and/or reproducing data and a control command are exchanged e.g., with an AV system 55.

To the above-described optical disc drive 50, a recording command and, for example, recording data, such as a picture bit stream, such as MPEG2 picture bit stream, are sent from the AV system 55. The recording data, sent from the AV system 55, are ECC-blocked by an ECC encoder/decoder 69 and subsequently subjected to data modulation for recording by the modulation/demodulation circuit 68. The system controller 53 acquires the current address information from the address decoder 52 and, based on this address information, shifts the recording position for the optical disc 1 to a desired address. The read/write circuit 52 performs recording compensation on the recording data and actuates the laser driver 44 at a clock timing generated by the clock generator 60 to record data on the optical disc 1.

The optical disc drive 50 is fed during reproduction with a replay command from the AV system 55. The system controller 53 acquires the current address information from the address decoder 52 and, based on the so acquired address information, shifts the replay position for the optical disc 1 to a desired address. The signal reproduced from the address are binary-coded by the read/write circuit 67 and demodulated by the modulation/demodulation circuit 68. An ECC encoder/decoder 69 sends the MPEG2 picture bit stream, obtained on error correction on the data for modulation, to the AV system 55.

4. Manufacturing Method for Optical Disc

The manufacturing method for the optical disc, to which is applied the above-described address format, is now explained.

The manufacturing process for an optical disc is roughly classified into a so-called master disc process (mastering process) and a disc forming process (replication process). The mastering process is a process up to the completion of a metal master disc (stamper) used in the disc forming process, and the disc forming process is a process for mass-producing optical discs, by way of duplication of the stamper, from the stamper.

In the mastering process, photoresist is coated on a polished glass substrate to form a photosensitive film, which is then subjected to cutting for forming pits or grooves by light exposure. During the cutting, pit cutting of forming pits or grooves in areas corresponding to embossed areas on the radially innermost side of the disc and wobble cutting of forming the wobbling grooves in an area corresponding to the groove-forming area are performed. On completion of the cutting, predetermined processing, such as development, is performed, after which the information is transferred, such as by electrocasting, onto the metal surface, to form a stamper necessary for duplicating the discs.

Figure 34:
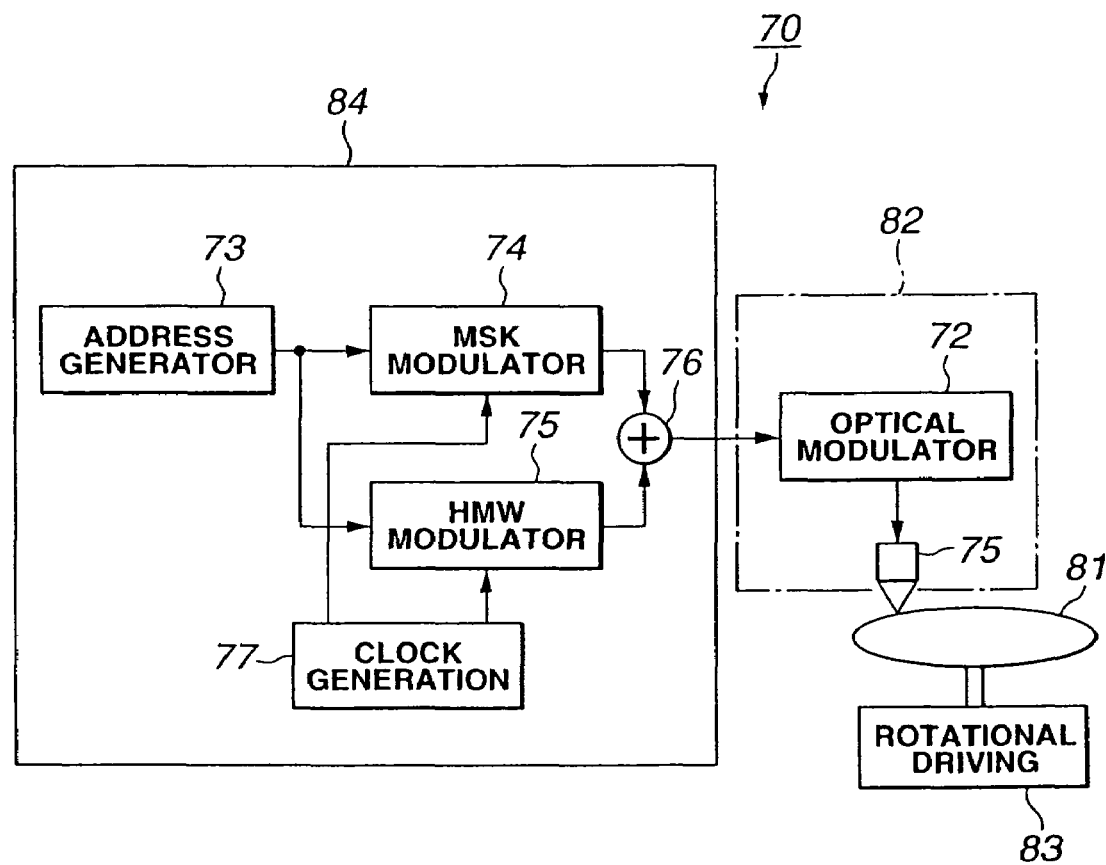
FIG. 34 shows the structure of a cutting device for an optical master disc embodying the present invention.

FIG. 34 shows a cutting device for performing wobble cutting on a master optical disc.

A cutting device 70 is made up of an optical unit 82 for irradiating a light beam on the substrate 81 coated with the photoresist for cutting, a rotational driving unit 83 for rotational driving the substrate 81, and a signal processor 84 for converting input data into recording signals and for controlling the optical unit 82 and the rotational driving unit 83.

The optical unit 82 includes a laser light source 71, such as He—Cd laser, and an optical modulator 72. The optical unit 82 is responsive to a wobble signal stream generated by the signal processor 84 to cut a pre-groove as it causes meandering of the laser beam emitted by the laser light source 71.

The rotational driving unit 83 runs the substrate 71 in rotation, so that the pre-groove will be formed spirally from the inner rim side, while causing the substrate 71 to be moved radially in controlled manner.

The signal processor 84 includes, for example, an address generator 73, an MSK modulator 74, an HMW modulator 75, an adder 76 and a reference clock generator 77.

The address generator 73 generates the address information for MSK modulating the pre-groove of the optical disc and the address information for HMW modulating the pre-grooves of the optical disc to send the address information so produced to an MSK modulator 74 and to an HMW modulator 75.

Based on reference clocks, generated by a reference clock generator 77, the MSK modulator 74 generates two frequencies, namely $\cos(\omega t)$ and $\cos(1.5\omega t)$. The MSK modulator 74 also generates, from the address information, a data stream at a predetermined timing position of which is formed the data for modulation synchronized with the reference clock. The MSK modulator 74 MSK modulates the data stream with the two frequencies of $\cos(\omega t)$ and $\cos(1.5\omega t)$ to generate MSK modulated signals. In the portion of the data stream in which the address information is not subjected to MSK modulation, the MSK modulator 74 generates a signal with a waveform of $\cos(\omega t)$ (monotone wobble).

Based on the reference clocks, generated by the reference clock generator 77, the HMW modulator 75 generates second harmonics ($\pm \sin(2\omega t)$), synchronized with $\cos(\omega t)$ generated by the MSK modulator 74. The HMW modulator 75 outputs the second harmonics at a timing of recording the address information by HMW modulation. This timing corresponds to the monotone wobble free of the MSK modulation. At this time, the HMW modulator 75 outputs $+\sin(2\omega t)$ and $-\sin(2\omega t)$ in a switching fashion depending on the digital sign of the input address information.

The adder 76 adds second harmonics signals, output from the HMW modulator 75, to the MSK modulated signals output from the MSK modulator 74.

The output signal of the adder 76 is sent as the wobble signal stream to the optical unit 82.

Thus, the cutting device 70 is able to record the wobble, modulated with the address information, on the optical disc, using two modulating systems, namely the MSK modulation system and the HMW modulating system.

Moreover, in the present cutting device 70, one of the frequencies used in the MSK modulating system and the carrier frequency used in the HMW modulation represent the sinusoidal wave signal of the same frequency ($\cos(\omega t)$) as that used in the HMW modulation. In the wobble signal, there is provided a monotone wobble, free of modulating data and containing only the carrier signal ($\cos(\omega t)$), between the wobble signals.

In addition, in the present cutting device 70, one of the frequencies used in the MSK modulation system and the carrier frequency used in the HMW modulation represent the sinusoidal wave signal of the same frequency ($\cos(\omega t)$). The MSK modulation and the HMW modulation are applied to different portions in the wobble signal, and harmonics signals are added to positions intended for HMW modulation for generating the modulated signal. Thus, a stream can be subjected to two modulations extremely simply.

INDUSTRIAL UTILIZABILITY

In the disc-shaped recording medium according to the present invention, a first digital information MSK modulated using a first sinusoidal signal of a predetermined frequency and using a second sinusoidal signal of a frequency different from the predetermined frequency, and a second digital information modulated onto a sinusoidal carrier signal by adding even harmonics signals to the sinusoidal carrier signal and by changing the polarity of the harmonics signals according to the second digital information (HMW modulated), are formed into a wobble signal of the recording track.

With this disc-shaped recording medium according to the present invention, the information, such as address information, can be efficiently formed into the wobble component to improve the S/N ratio in reproducing the information thus formed into the wobble component.

The disc driving device according to the present invention, the wobble information demodulating means includes a first demodulating unit for retrieving the first digital information which is MSK modulated using a first sinusoidal signal of a predetermined frequency and using a sinusoidal signal of a frequency different from the predetermined frequency of the first sinusoidal signal and a second demodulating unit for retrieving the second digital information which is modulated onto a sinusoidal carrier signal by adding even harmonics signals to the sinusoidal carrier signal and by changing the polarity of the harmonics signals according to the second digital information (HMW modulated).

With the disc driving device according to the present invention, the wobble signal can be demodulated with high S/N from the disc-shaped recording medium in which the information such as address information has been efficiently formed into its wobble components.

In the method and apparatus for producing the disc according to the present invention, the land and/or the groove of the disc-shaped recording medium can be meanderingly produced depending on the wobble signal into which have been formed a first digital information MSK modulated using a first sinusoidal signal of a predetermined frequency and using a second sinusoidal signal of a frequency different from the predetermined frequency of the first sinusoidal signal, and a second digital information modulated onto a sinusoidal carrier signal by adding even harmonics signals to the sinusoidal carrier signal and by changing the polarity of the harmonics signals according to the second digital information (HMW modulated).

With the apparatus for producing the disc, according to the present invention, such a disc-shaped recording medium can be produced in which e.g., the address information is efficiently formed into the wobble components and in which the information formed into the wobble components can be reproduced with an improved S/N ratio.

The invention claimed is:

1. A disc-shaped recording medium having a land and/or a groove formed thereon in a circling fashion for operating as a recording track, said recording track meandering depending on a wobble signal, wherein
said wobble signal comprises
a first digital information MSK modulated using a first sinusoidal signal of a predetermined frequency and using a second sinusoidal signal of a frequency different from said predetermined frequency, and
a second digital information modulated onto a sinusoidal carrier signal by adding even harmonics signals to said sinusoidal carrier signal and by changing the polarity of said harmonics signals according to said second digital information (HMW modulated).

2. The disc-shaped recording medium according to claim 1 wherein the frequency of the first sinusoidal signal used in said MSK modulation is the same as the frequency of the carrier signal used in said HMW modulation.

3. The disc-shaped recording medium according to claim 2 wherein at least the address information of said recording track is contained in said first digital information and/or said second digital information.

4. The disc-shaped recording medium according to claim 3 wherein the address information is recorded in terms of an address unit formed by a predetermined number of periods of said carrier signal as a unit; and wherein
said first address information MSK modulated and the second address information HMW modulated are recorded at different positions in said address unit.

5. The disc-shaped recording medium according to claim 4 wherein at least not less than one period of said carrier signal is recorded between the MSK modulated first address information and the HMW modulated second address information.

6. The disc-shaped recording medium according to claim 4 wherein the MSK modulated first address information and the HMW modulated second address information represent the same information.

7. The disc-shaped recording medium according to claim 1 wherein a spirally formed groove serves as the recording track.

8. The disc-shaped recording medium according to claim 1 wherein said first digital information and the second digital information contain the information of the same contents.

9. The disc-shaped recording medium according to claim 1 wherein
said first digital information is modulated such that data for modulation having a code length equal to an integral number not less than 2 times the period of said first sinusoidal signal is differential-encoded with a period of said first sinusoidal signal to produce differential encoded data having a code length resulting from differential coding equal to one period of said first sinusoidal signal, and such that said first and second sinusoidal signals are selected depending on the sign of the differential encoded data.

10. The disc-shaped recording medium according to claim 1 wherein the frequency of said second sinusoidal signal is 3/2 times the frequency of the first sinusoidal signal.

11. The disc-shaped recording medium according to claim 1 wherein,
in said first digital information, an MSK modulation mark obtained on MSK modulation of data for modulation of a predetermined code pattern is inserted into a bit block formed by a predetermined number of consecutive periods of said first sinusoidal signal, with the inserting position of said MSK modulation mark in said bit block representing the sign of the first digital information.

12. The disc-shaped recording medium according to claim 11 wherein a bit synchronization mark obtained on MSK modulation of data for modulation of a predetermined code pattern is inserted at the leading end of said bit block.

13. The disc-shaped recording medium according to claim 12 wherein the data contents of the first digital information are represented by synthesizing the codes represented by respective bit blocks in one information unit which is formed by a plural number of consecutive bit blocks.

14. The disc-shaped recording medium according to claim 13 wherein, in one or more leading bit block of said information unit, an insertion pattern of an MSK modulation mark obtained on MSK modulation of data for modulation of a predetermined code pattern is an inserting pattern unique with respect to other bit blocks.

15. The disc-shaped recording medium according to claim 1 wherein said second digital information is HMW modulated by adding −12 dB harmonics signals to said sinusoidal carrier signal.

16. The disc-shaped recording medium according to claim 1 wherein said second digital information is HMW modulated by adding second harmonics signals of the sinusoidal carrier signal to said sinusoidal carrier signal.

17. A disc-shaped recording medium having a land and/or a groove formed thereon in a circling fashion for operating as a recording track, said recording track meandering depending on a wobble signal, wherein
an address unit with the address information stated therein is formed in said wobble signal as a predetermined data unit, said address information comprising at least an address of the recording track, said address unit is constructed to include at least one bit block representing bits forming said address information, and said at least one block is formed in a waveform comprising a predetermined number of consecutive periods of a sinusoidal carrier signal by inserting a first bit string MSK modulated using said sinusoidal carrier signal and using a further sinusoidal signal of a frequency different from a frequency of said sinusoidal carrier signal, and a second bit string modulated onto said sinusoidal carrier signal by adding even harmonics signals to said sinusoidal carrier signal and by changing the polarity of said harmonics signals according to said second bit string (HMW modulated).

18. The disc-shaped recording medium according to claim 17 wherein
said first and second bit strings are inserted at different positions in said bit block.

19. The disc-shaped recording medium according to claim 18 wherein there is at least one period of said carrier signal between said first and second bit strings.

20. The disc-shaped recording medium according to claim 17 wherein said first and second bit strings represent the same bit string.

21. The disc-shaped recording medium according to claim 17 wherein
a bit synchronization mark obtained on MSK modulation of data for modulation of a predetermined pattern is inserted at the leading end of said bit block.

22. The disc-shaped recording medium according to claim 17 wherein
said address unit comprises at least one synchronization block having a waveform which is formed by a predetermined number of consecutive periods of the sinusoidal carrier signal, and an MSK modulation mark inserted into said waveform, said MSK modulation mark having been obtained on MSK modulation of data for modulation of a predetermined code pattern, with an insertion pattern of said MSK modulation mark being a unique insertion pattern.

23. The disc-shaped recording medium according to claim 22 wherein said synchronization block is inserted in the leading part of the address unit.

24. The disc-shaped recording medium according to claim 17 wherein the frequency of a sinusoidal signal used in MSK modulation is 3/2 times the frequency of the carrier signal.

25. The disc-shaped recording medium according to claim 17 wherein the harmonics signals used in HMW modulation are second harmonics signals having an amplitude of −12 dB relative to the carrier signal.

26. The disc-shaped recording medium according to claim 17 wherein said first bit string is represented by an inserting position of the MSK modulation mark in said bit block, said MSK modulation mark having been obtained on MSK modulation of data for modulation of a predetermined bit pattern.

27. The disc-shaped recording medium according to claim 17 wherein said first bit is modulated by differential-coding data for modulation, having a code length twice the period of said carrier signal, with the period of said carrier signal, to generate differential-coded data having a code length resulting from the differential coding equal to one period of the carrier signal;
with the frequency being selected depending on the sign of the differential-coded data.

28. A disc driving device for recording and/or reproducing a disc-shaped recording medium, having a land and/or a groove formed thereon in a circling fashion for operating as a recording track, said recording track meandering depending on a wobble signal said disc driving device comprising:
wobble information demodulating means for reproducing said wobble signal from said disc-shaped recording medium and for demodulating said wobble signal to retrieve the digital information contained in said wobble signal;
wherein said wobble information demodulating means includes:
a first demodulating unit for retrieving the first digital information which is MSK modulated using a first sinusoidal signal of a predetermined frequency and using a sinusoidal signal of a frequency different from the predetermined frequency of said first sinusoidal signal; and
a second demodulating unit for retrieving the second digital information which is modulated onto a sinusoidal carrier signal by adding even harmonics signals to said sinusoidal carrier signal and by changing the polarity of said harmonics signals according to said second digital information (HMW modulated).

29. The disc driving device according to claim 28 comprising:
control means for controlling the recording or reproducing position for said disc-shaped recording medium;
said wobble information demodulating means demodulating the address information of said recording track contained in the first digital information and/or the second digital information;
said control means controlling the recording or the reproducing position for said disc-shaped recording medium based on said address information.

30. An apparatus for manufacturing a disc-shaped recording medium by forming a land and/or a groove in a circling fashion on a surface of a master disc of a disc-shaped recording medium, said apparatus comprising:
means for forming said land and/or groove in a meandering fashion depending on a wobble signal including
a first digital information MSK modulated using a first sinusoidal signal of a predetermined frequency and using a second sinusoidal signal of a frequency different from said predetermined frequency of said first sinusoidal signal, and
a second digital information modulated onto a sinusoidal carrier signal by adding even harmonics signals to said sinusoidal carrier signal and by changing the polarity of said harmonics signals according to said second digital information (HMW modulated).

31. A method for manufacturing a disc-shaped recording medium by forming a land and/or a groove in a circling fashion on a surface of a master disc of a disc-shaped recording medium, said method comprising the step of:
forming said land and/or groove in a meandering fashion depending on a wobble signal including
a first digital information MSK modulated using a first sinusoidal signal of a predetermined frequency and using a second sinusoidal signal of a frequency different from said predetermined frequency of said first sinusoidal signal, and
a second digital information modulated onto a sinusoidal carrier signal by adding even harmonics signals to said sinusoidal carrier signal and by changing the polarity of said harmonics signals according to said second digital information (HMW modulated).

* * * * *